(12) United States Patent
Cossairt et al.

(10) Patent No.: US 11,682,172 B2
(45) Date of Patent: Jun. 20, 2023

(54) INTERACTIVE VIDEO GAME SYSTEM HAVING AN AUGMENTED VIRTUAL REPRESENTATION

(71) Applicant: Universal City Studios LLC, Universal City, CA (US)

(72) Inventors: Travis Jon Cossairt, Celebration, FL (US); Wei Cheng Yeh, Orlando, FL (US); Neil Andrew Leiba, Orlando, FL (US); Erica Lynn McCay, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 54 days.

(21) Appl. No.: 17/170,618

(22) Filed: Feb. 8, 2021

(65) Prior Publication Data
US 2021/0158627 A1 May 27, 2021

Related U.S. Application Data

(63) Continuation of application No. 16/149,563, filed on Oct. 2, 2018, now Pat. No. 10,916,059, which is a
(Continued)

(51) Int. Cl.
*G06T 19/00* (2011.01)
*A63F 13/213* (2014.01)
(Continued)

(52) U.S. Cl.
CPC .......... *G06T 19/006* (2013.01); *A63F 13/213* (2014.09); *A63F 13/428* (2014.09);
(Continued)

(58) Field of Classification Search
CPC ........ A63F 13/21; A63F 13/213; A63F 13/27; A63F 13/40; A63F 2300/1093;
(Continued)

(56) References Cited

U.S. PATENT DOCUMENTS 5,946,444 A 8/1999 Evans et al.
6,141,463 A 10/2000 Covell et al.
(Continued)

FOREIGN PATENT DOCUMENTS

JP 2003288472 A 10/2003
JP 2004126791 A 4/2004
(Continued)

OTHER PUBLICATIONS

Clements, Ryan; "Kinect Adventures Review—IGN", Nov. 3, 2010; URL:https://www.ign.com/articles/2010/11/04/kinect-adventures-review; pp. 6-8.
(Continued)

*Primary Examiner* — Lawrence S Galka
(74) *Attorney, Agent, or Firm* — Fletcher Yoder, P.C.

(57) ABSTRACT

An interactive video game system includes at least one sensor and at least one display device disposed near a play area. The system also includes a controller communicatively coupled to the at least one sensor and the at least one display device, wherein the controller is configured to: receive, from the at least one sensor, the scanning data of the player in the play area; generate at least one model from the scanning data of the player; identify an action of the player in the play area based on the at least one model; generate the virtual representation for the player based on the at least one model and the action of the player; and present, on the display device, the virtual representation of the player in a virtual environment, wherein an action of the virtual representation is augmented relative to the action of the player.

20 Claims, 13 Drawing Sheets

Related U.S. Application Data continuation-in-part of application No. 15/833,839, filed on Dec. 6, 2017, now Pat. No. 10,653,957.

(51) Int. Cl.
- *G06F 3/01* (2006.01)
- *G06F 3/00* (2006.01)
- *A63F 13/655* (2014.01)
- *A63F 13/428* (2014.01)
- *A63F 13/843* (2014.01)

(52) U.S. Cl.
CPC .......... *A63F 13/655* (2014.09); *A63F 13/843* (2014.09); *G06F 3/005* (2013.01); *G06F 3/011* (2013.01)

(58) Field of Classification Search
CPC ..... A63F 2300/5553; A63F 2300/8088; G06F 3/011; G06F 3/017; G06F 2203/012; G06K 9/00335; G06K 9/00342; G06T 2200/08

See application file for complete search history.

(56) References Cited

U.S. PATENT DOCUMENTS

| | | |
|---|---|---|
| 6,142,368 A | 11/2000 | Mullins et al. |
| 6,307,952 B1 | 10/2001 | Dietz |
| 6,346,886 B1 | 2/2002 | De La Huerga |
| 6,352,205 B1 | 3/2002 | Mullins et al. |
| 6,474,557 B2 | 11/2002 | Mullins et al. |
| 6,507,353 B1 | 1/2003 | Huard et al. |
| 6,526,158 B1 | 2/2003 | Goldberg |
| 6,634,949 B1 | 10/2003 | Briggs et al. |
| 6,680,707 B2 | 1/2004 | Allen et al. |
| 6,761,637 B2 | 7/2004 | Weston et al. |
| 6,822,569 B1 | 11/2004 | Bellum et al. |
| 6,888,502 B2 | 5/2005 | Beigel et al. |
| 6,908,387 B2 | 6/2005 | Hedrick et al. |
| 6,921,332 B2 | 7/2005 | Fukunaga et al. |
| 6,967,566 B2 | 11/2005 | Weston et al. |
| 7,029,400 B2 | 4/2006 | Briggs |
| 7,047,205 B2 | 5/2006 | Hale et al. |
| 7,066,781 B2 | 6/2006 | Weston |
| 7,071,914 B1 | 7/2006 | Marks |
| 7,204,425 B2 | 4/2007 | Mosher, Jr. et al. |
| 7,224,967 B2 | 5/2007 | Hale et al. |
| 7,311,605 B2 | 12/2007 | Moser |
| 7,327,251 B2 | 2/2008 | Corbett, Jr. |
| 7,336,178 B2 | 2/2008 | Le |
| 7,336,185 B2 | 2/2008 | Turner et al. |
| 7,385,498 B2 | 6/2008 | Dobosz |
| 7,396,281 B2 | 7/2008 | Mendelsohn et al. |
| 7,400,253 B2 | 7/2008 | Cohen |
| 7,445,550 B2 | 11/2008 | Barney et al. |
| 7,479,886 B2 | 1/2009 | Burr |
| 7,488,231 B2 | 2/2009 | Weston |
| 7,492,254 B2 | 2/2009 | Bandy et al. |
| 7,500,917 B2 | 3/2009 | Barney et al. |
| 7,528,729 B2 | 5/2009 | Light et al. |
| 7,541,926 B2 | 6/2009 | Dugan et al. |
| 7,564,360 B2 | 7/2009 | Cote et al. |
| 7,564,426 B2 | 7/2009 | Poor et al. |
| 7,606,540 B2 | 10/2009 | Yoon |
| 7,614,958 B2 | 11/2009 | Weston et al. |
| 7,642,921 B2 | 1/2010 | Cutler et al. |
| 7,674,184 B2 | 3/2010 | Briggs et al. |
| 7,720,718 B2 | 5/2010 | Hale et al. |
| 7,739,925 B2 | 6/2010 | Foster |
| 7,749,089 B1 | 7/2010 | Briggs et al. |
| 7,752,794 B2 | 7/2010 | Kerlin |
| 7,775,894 B2 | 8/2010 | Henry et al. |
| 7,786,871 B2 | 8/2010 | Schwarze et al. |
| 7,791,557 B2 | 9/2010 | Mickle et al. |
| 7,802,724 B1 | 9/2010 | Nohr |
| 7,812,779 B2 | 10/2010 | Turner et al. |
| 7,817,044 B2 | 10/2010 | Posamentier |
| 7,837,567 B2 | 11/2010 | Holzberg et al. |
| 7,850,527 B2 | 12/2010 | Barney et al. |
| 7,855,697 B2 | 12/2010 | Chamarti et al. |
| 7,878,905 B2 | 2/2011 | Weston et al. |
| 7,881,713 B2 | 2/2011 | Hale et al. |
| 7,885,763 B2 | 2/2011 | Havens |
| 7,896,742 B2 | 3/2011 | Weston et al. |
| 7,925,308 B2 | 4/2011 | Greene et al. |
| 7,942,320 B2 | 5/2011 | Joe |
| 7,956,725 B2 | 6/2011 | Smith |
| 7,994,910 B2 | 8/2011 | Brooks et al. |
| 7,997,981 B2 | 8/2011 | Rowe et al. |
| 8,016,667 B2 | 9/2011 | Benbrahim |
| 8,035,335 B2 | 10/2011 | Duron et al. |
| 8,082,165 B2 | 12/2011 | Natsuyama et al. |
| 8,085,130 B2 | 12/2011 | Liu et al. |
| 8,089,458 B2 | 1/2012 | Barney et al. |
| 8,123,613 B2 | 2/2012 | Dabrowski |
| 8,164,567 B1 | 4/2012 | Barney et al. |
| 8,169,406 B2 | 5/2012 | Barney et al. |
| 8,184,097 B1 | 5/2012 | Barney et al. |
| 8,200,515 B2 | 6/2012 | Natsuyama et al. |
| 8,213,862 B2 | 7/2012 | Muth |
| 8,222,996 B2 | 7/2012 | Smith et al. |
| 8,226,493 B2 | 7/2012 | Briggs et al. |
| 8,231,047 B2 | 7/2012 | Canora |
| 8,237,561 B2 | 8/2012 | Beigel et al. |
| 8,248,208 B2 | 8/2012 | Renfro, Jr. |
| 8,248,367 B1 | 8/2012 | Barney et al. |
| 8,253,533 B2 | 8/2012 | Jones |
| 8,253,542 B2 | 8/2012 | Canora et al. |
| 8,296,983 B2 | 10/2012 | Padgett et al. |
| 8,313,381 B2 | 11/2012 | Ackley et al. |
| 8,330,284 B2 | 12/2012 | Weston et al. |
| 8,330,587 B2 | 12/2012 | Kupstas |
| 8,342,929 B2 | 1/2013 | Briggs et al. |
| 8,353,705 B2 | 1/2013 | Dobson et al. |
| 8,368,648 B2 | 2/2013 | Barney et al. |
| 8,373,543 B2 | 2/2013 | Brommer et al. |
| 8,373,659 B2 | 2/2013 | Barney et al. |
| 8,384,668 B2 | 2/2013 | Barney et al. |
| 8,392,506 B2 | 3/2013 | Rowe et al. |
| 8,416,087 B2 | 4/2013 | Canora et al. |
| 8,425,313 B2 | 4/2013 | Nelson et al. |
| 8,430,749 B2 | 4/2013 | Nelson et al. |
| 8,437,506 B2 | 5/2013 | Williams et al. |
| 8,463,183 B2 | 6/2013 | Muth |
| 8,475,275 B2 | 7/2013 | Weston et al. |
| 8,477,046 B2 | 7/2013 | Alonso |
| 8,489,657 B2 | 7/2013 | Shepherd et al. |
| 8,491,389 B2 | 7/2013 | Weston et al. |
| 8,531,050 B2 | 9/2013 | Barney et al. |
| 8,552,597 B2 | 10/2013 | Song et al. |
| 8,564,414 B2 | 10/2013 | Bergevoet |
| 8,571,905 B2 | 10/2013 | Risnoveanu et al. |
| 8,581,721 B2 | 11/2013 | Asher et al. |
| 8,593,283 B2 | 11/2013 | Smith |
| 8,593,291 B2 | 11/2013 | Townsend et al. |
| 8,597,111 B2 | 12/2013 | LeMay et al. |
| 8,608,535 B2 | 12/2013 | Weston et al. |
| 8,618,928 B2 | 12/2013 | Weed et al. |
| 8,621,245 B2 | 12/2013 | Shearer et al. |
| 8,635,126 B2 | 1/2014 | Risnoveanu et al. |
| 8,681,000 B2 | 3/2014 | August et al. |
| 8,682,729 B2 | 3/2014 | Werbitt |
| 8,686,579 B2 | 4/2014 | Barney et al. |
| 8,702,515 B2 | 4/2014 | Weston et al. |
| 8,708,821 B2 | 4/2014 | Barney et al. |
| 8,711,094 B2 | 4/2014 | Barney et al. |
| 8,742,623 B1 | 6/2014 | Biederman et al. |
| 8,753,165 B2 | 6/2014 | Weston |
| 8,758,136 B2 | 6/2014 | Briggs et al. |
| 8,773,245 B2 | 7/2014 | Canora et al. |
| 8,790,180 B2 | 7/2014 | Barney et al. |
| 8,797,146 B2 | 8/2014 | Cook et al. |
| 8,810,373 B2 | 8/2014 | Kim et al. |
| 8,810,430 B2 | 8/2014 | Proud |

(56) References Cited

U.S. PATENT DOCUMENTS

| | | |
|---|---|---|
| 8,814,688 B2 | 8/2014 | Barney et al. |
| 8,816,873 B2 | 8/2014 | Bisset et al. |
| 8,821,238 B2 | 9/2014 | Ackley et al. |
| 8,827,810 B2 | 9/2014 | Weston et al. |
| 8,830,030 B2 | 9/2014 | Arthurs et al. |
| 8,851,372 B2 | 10/2014 | Zhou et al. |
| 8,866,673 B2 | 10/2014 | Mendelson |
| 8,870,641 B2 | 10/2014 | Dabrowski |
| 8,885,920 B2* | 11/2014 | Lim .................. G06V 40/103 382/209 |
| 8,888,576 B2 | 11/2014 | Briggs et al. |
| 8,913,011 B2 | 12/2014 | Barney et al. |
| 8,915,785 B2 | 12/2014 | Barney et al. |
| 8,917,172 B2 | 12/2014 | Charych |
| 8,923,994 B2 | 12/2014 | Laikari et al. |
| 8,924,432 B2 | 12/2014 | Richards et al. |
| 8,937,530 B2 | 1/2015 | Smith et al. |
| 8,961,260 B2 | 2/2015 | Weston |
| 8,961,312 B2 | 2/2015 | Barney et al. |
| 8,971,804 B2 | 3/2015 | Butler |
| 8,972,048 B2 | 3/2015 | Canora et al. |
| 9,002,264 B2 | 4/2015 | Zhang |
| 9,021,277 B2 | 4/2015 | Shearer et al. |
| 9,039,533 B2 | 5/2015 | Barney et al. |
| 9,072,965 B2 | 7/2015 | Kessman et al. |
| 9,087,246 B1 | 7/2015 | Chin et al. |
| 9,109,763 B1 | 8/2015 | Wein |
| 9,122,964 B2 | 9/2015 | Krawczewicz |
| 9,130,651 B2 | 9/2015 | Tabe |
| 9,138,650 B2 | 9/2015 | Barney et al. |
| 9,149,717 B2 | 10/2015 | Barney et al. |
| 9,159,151 B2 | 10/2015 | Perez et al. |
| 9,162,148 B2 | 10/2015 | Barney et al. |
| 9,162,149 B2 | 10/2015 | Weston et al. |
| 9,178,569 B2 | 11/2015 | Chakravarty et al. |
| 9,183,676 B2 | 11/2015 | McCulloch et al. |
| 9,186,585 B2 | 11/2015 | Briggs et al. |
| 9,196,964 B2 | 11/2015 | Baringer |
| 9,207,650 B2 | 12/2015 | Narendra et al. |
| 9,215,592 B2 | 12/2015 | Narendra et al. |
| 9,225,372 B2 | 12/2015 | Butler |
| 9,229,530 B1 | 1/2016 | Wu et al. |
| 9,232,475 B2 | 1/2016 | Heinzelman et al. |
| 9,245,158 B2 | 1/2016 | Gudan et al. |
| 9,272,206 B2 | 3/2016 | Weston et al. |
| 9,318,898 B2 | 4/2016 | John |
| 9,320,976 B2 | 4/2016 | Weston |
| 9,367,852 B2 | 6/2016 | Canora et al. |
| 9,377,857 B2 | 6/2016 | Geisner et al. |
| 9,383,730 B2 | 7/2016 | Prestenback |
| 9,393,491 B2 | 7/2016 | Barney et al. |
| 9,393,500 B2 | 7/2016 | Barney et al. |
| 9,411,992 B1 | 8/2016 | Marek et al. |
| 9,412,231 B2 | 8/2016 | Dabrowski |
| 9,413,229 B2 | 8/2016 | Fleming |
| 9,424,451 B2 | 8/2016 | Kalhous et al. |
| 9,438,044 B2 | 9/2016 | Proud |
| 9,443,382 B2 | 9/2016 | Lyons |
| 9,446,319 B2 | 9/2016 | Barney et al. |
| 9,463,380 B2 | 10/2016 | Weston et al. |
| 9,468,854 B2 | 10/2016 | Briggs et al. |
| 9,474,962 B2 | 10/2016 | Barney et al. |
| 9,480,929 B2 | 11/2016 | Weston |
| 9,483,906 B2 | 11/2016 | LeMay et al. |
| 9,491,584 B1 | 11/2016 | Mendelson |
| 9,523,775 B2 | 12/2016 | Chakraborty et al. |
| 9,542,579 B2 | 1/2017 | Mangold et al. |
| 9,563,898 B2 | 2/2017 | McMahan et al. |
| 9,579,568 B2 | 2/2017 | Barney et al. |
| 9,582,981 B2 | 2/2017 | Rokhsaz et al. |
| 9,589,224 B2 | 3/2017 | Patterson et al. |
| 9,613,237 B2 | 4/2017 | Nikunen et al. |
| 9,616,334 B2 | 4/2017 | Weston et al. |
| 9,626,672 B2 | 4/2017 | Fisher |
| 9,642,089 B2 | 5/2017 | Sharma et al. |
| 9,646,312 B2 | 5/2017 | Lyons et al. |
| 9,651,992 B2 | 5/2017 | Stotler |
| 9,661,450 B2 | 5/2017 | Agrawal et al. |
| 9,675,878 B2 | 6/2017 | Barney et al. |
| 9,680,533 B2 | 6/2017 | Gudan et al. |
| 9,692,230 B2 | 6/2017 | Biederman et al. |
| 9,696,802 B2 | 7/2017 | Priyantha et al. |
| 9,706,924 B2 | 7/2017 | Greene |
| 9,707,478 B2 | 7/2017 | Barney et al. |
| 9,713,766 B2 | 7/2017 | Barney et al. |
| 9,731,194 B2 | 8/2017 | Briggs et al. |
| 9,737,797 B2 | 8/2017 | Barney et al. |
| 9,741,022 B2 | 8/2017 | Ziskind et al. |
| 9,743,357 B2 | 8/2017 | Tabe |
| 9,747,538 B2 | 8/2017 | Gudan et al. |
| 9,748,632 B2 | 8/2017 | Rokhsaz et al. |
| 9,754,139 B2 | 9/2017 | Chemishkian et al. |
| 9,754,202 B2 | 9/2017 | Gudan et al. |
| 9,756,579 B2 | 9/2017 | Zhou et al. |
| 9,762,292 B2 | 9/2017 | Manian et al. |
| 9,767,649 B2 | 9/2017 | Dabrowski |
| 9,770,652 B2 | 9/2017 | Barney et al. |
| 9,813,855 B2 | 11/2017 | Sahadi et al. |
| 9,814,973 B2 | 11/2017 | Barney et al. |
| 9,821,224 B2 | 11/2017 | Latta et al. |
| 9,831,724 B2 | 11/2017 | Copeland et al. |
| 9,836,103 B2 | 12/2017 | Kramer et al. |
| 9,837,865 B2 | 12/2017 | Mitcheson et al. |
| 9,861,887 B1 | 1/2018 | Briggs et al. |
| 9,864,882 B1 | 1/2018 | Geist et al. |
| 9,867,024 B1 | 1/2018 | Larson |
| 9,871,298 B2 | 1/2018 | Daniel et al. |
| 9,909,896 B2 | 3/2018 | Bass et al. |
| 9,928,527 B2 | 3/2018 | Woycik et al. |
| 9,928,681 B2 | 3/2018 | LeMay, Jr. et al. |
| 9,931,578 B2 | 4/2018 | Weston |
| 9,936,357 B2 | 4/2018 | Mills et al. |
| 9,949,219 B2 | 4/2018 | Belogolovy |
| 9,972,894 B2 | 5/2018 | Dion et al. |
| 9,993,724 B2 | 6/2018 | Barney et al. |
| 10,010,790 B2 | 7/2018 | Weston et al. |
| 10,022,624 B2 | 7/2018 | Barney et al. |
| 2008/0151092 A1 | 6/2008 | Vilcovsky |
| 2010/0302138 A1* | 12/2010 | Poot .................. G06F 3/017 348/143 |
| 2010/0303289 A1* | 12/2010 | Polzin .................. G06V 20/00 348/135 |
| 2010/0306715 A1 | 12/2010 | Geisner et al. |
| 2011/0054870 A1 | 3/2011 | Dariush et al. |
| 2011/0069866 A1* | 3/2011 | Kim .................. G06T 7/174 382/209 |
| 2011/0210915 A1* | 9/2011 | Shotton .................. G06V 40/103 345/157 |
| 2012/0286938 A1 | 11/2012 | Cote et al. |
| 2012/0309535 A1 | 12/2012 | Langridge et al. |
| 2013/0194182 A1* | 8/2013 | Tarama .................. A63F 13/46 345/158 |
| 2013/0324059 A1 | 12/2013 | Lee et al. |
| 2014/0094307 A1* | 4/2014 | Doolittle .................. G06V 20/64 463/36 |
| 2014/0122170 A1 | 5/2014 | Padgett et al. |
| 2014/0162693 A1 | 6/2014 | Wachter et al. |
| 2014/0176565 A1 | 6/2014 | Adeyoola et al. |
| 2014/0198096 A1 | 7/2014 | Mitchell |
| 2015/0046202 A1 | 2/2015 | Hunt |
| 2015/0078140 A1 | 3/2015 | Riobo Aboy et al. |
| 2015/0138556 A1 | 5/2015 | LeBoeuf et al. |
| 2015/0194817 A1 | 7/2015 | Lee et al. |
| 2015/0236551 A1 | 8/2015 | Shearer et al. |
| 2015/0244976 A1 | 8/2015 | Chen et al. |
| 2015/0255226 A1 | 9/2015 | Rouvala et al. |
| 2015/0312517 A1 | 10/2015 | Hoyt et al. |
| 2015/0336013 A1 | 11/2015 | Stenzler et al. |
| 2015/0371194 A1 | 12/2015 | Marshall et al. |
| 2016/0019423 A1 | 1/2016 | Ortiz et al. |
| 2016/0020636 A1 | 1/2016 | Khlat |
| 2016/0020637 A1 | 1/2016 | Khlat |
| 2016/0067600 A1 | 3/2016 | Barney et al. |
| 2016/0129335 A1 | 5/2016 | Domansky et al. |

(56) References Cited

U.S. PATENT DOCUMENTS

| | | |
|---|---|---|
| 2016/0144280 A1 | 5/2016 | Pawlowski et al. |
| 2016/0170998 A1 | 6/2016 | Frank et al. |
| 2016/0182165 A1 | 6/2016 | Margon et al. |
| 2016/0203663 A1 | 7/2016 | Proctor |
| 2016/0217496 A1 | 7/2016 | Tuchman et al. |
| 2016/0226610 A1 | 8/2016 | Pinzon Gonzales, Jr. |
| 2016/0275722 A1 | 9/2016 | Bretschneider et al. |
| 2016/0279516 A1 | 9/2016 | Gupta et al. |
| 2016/0307398 A1 | 10/2016 | Walker et al. |
| 2016/0321548 A1 | 11/2016 | Ziskind et al. |
| 2016/0373522 A1 | 12/2016 | Carlos et al. |
| 2017/0091850 A1 | 3/2017 | Alvarez et al. |
| 2017/0093463 A1 | 3/2017 | Wang et al. |
| 2017/0115018 A1 | 4/2017 | Mintz |
| 2017/0132438 A1 | 5/2017 | Cletheroe et al. |
| 2017/0162006 A1 | 6/2017 | Sahadi et al. |
| 2017/0169449 A1 | 6/2017 | Heaven et al. |
| 2017/0186270 A1 | 6/2017 | Acres |
| 2017/0201003 A1 | 7/2017 | Ackley et al. |
| 2017/0225069 A1 | 8/2017 | Goslin et al. |
| 2017/0228804 A1 | 8/2017 | Soni et al. |
| 2017/0235369 A1 | 8/2017 | Acer et al. |
| 2017/0237466 A1 | 8/2017 | Carr |
| 2017/0270734 A1 | 9/2017 | Geraghty et al. |
| 2017/0288735 A1 | 10/2017 | Zhou et al. |
| 2017/0293985 A1 | 10/2017 | Deria et al. |
| 2017/0331509 A1 | 11/2017 | Gollakota et al. |
| 2017/0340961 A1 | 11/2017 | Weston et al. |
| 2017/0345167 A1 | 11/2017 | Ard et al. |
| 2017/0348593 A1 | 12/2017 | Barney et al. |
| 2017/0358957 A1 | 12/2017 | Mitcheson et al. |
| 2017/0361216 A1 | 12/2017 | Cao |
| 2017/0361236 A1 | 12/2017 | Barney et al. |
| 2017/0373526 A1 | 12/2017 | Huang et al. |
| 2018/0014385 A1 | 1/2018 | Wein |
| 2018/0078853 A1 | 3/2018 | Barney et al. |
| 2018/0101244 A1 | 4/2018 | Orrick et al. |
| 2018/0108183 A1 | 4/2018 | Schuneman et al. |
| 2018/0214769 A1 | 8/2018 | Briggs et al. |
| 2018/0318723 A1 | 11/2018 | Weston |
| 2018/0339226 A1 | 11/2018 | Barney et al. |
| 2018/0365887 A1 | 12/2018 | Wang et al. |

FOREIGN PATENT DOCUMENTS

| | | |
|---|---|---|
| JP | 2005267179 A | 9/2005 |
| JP | 2010000178 A | 1/2010 |
| JP | 2012244846 A | 12/2012 |
| JP | 2013188019 A | 9/2013 |
| JP | 6152919 B1 | 6/2017 |

OTHER PUBLICATIONS

Mirabella, Fran; "Your Shape: Fitness Evolved Review—IGN", Nov. 8, 2010; URL:https://www.ign.com/articles/2010/11/09/your-shape-fitness-evolved-review; pp. 6-8.
U.S. Appl. No. 15/861,502, filed Jan. 3, 2018, Wei Cheng Yeh.
U.S. Appl. No. 15/874,671, filed Jan. 18, 2018, Wei Cheng Yeh.
U.S. Appl. No. 15/882,761, filed Jan. 29, 2018, Wei Cheng Yeh.
U.S. Appl. No. 15/882,721, filed Jan. 29, 2018, Wei Cheng Yeh.
U.S. Appl. No. 15/882,788, filed Jan. 29, 2018, Wei Cheng Yeh.
U.S. Appl. No. 15/882,738, filed Jan. 29, 2018, Travis Jon Cossairt.
U.S. Appl. No. 15/972,940, filed May 7, 2018.
U.S. Appl. No. 15/995,633, filed Jun. 1, 2018.
U.S. Appl. No. 16/196,967, filed Nov. 20, 2018, Matthew Usi.
U.S. Appl. No. 15/826,357, filed Nov. 29, 2017, Wei Yeh.
JP Office Action for Japanese Application No. 2020-530524 dated Dec. 12, 2022.

* cited by examiner

INTERACTIVE VIDEO GAME SYSTEM HAVING AN AUGMENTED VIRTUAL REPRESENTATION

CROSS-REFERENCE TO RELATED APPLICATIONS

This application is a continuation of U.S. patent application Ser. No. 16/149,563, entitled "INTERACTIVE VIDEO GAME SYSTEM HAVING AN AUGMENTED VIRTUAL REPRESENTATION," filed Oct. 2, 2018, which is a continuation-in-part of U.S. patent application Ser. No. 15/833,839, now U.S. Pat. No. 10,653,957, entitled "INTERACTIVE VIDEO GAME SYSTEM," filed Dec. 6, 2017, each of which is hereby incorporated by reference in its entirety.

BACKGROUND

The present disclosure relates generally to video game systems and, more specifically, to an interactive video game system that enables simultaneous multi-player game play.

Video game systems generally enable players to control characters in a virtual environment to achieve predefined goals or objectives. Traditional video game systems generally rely on manual input devices, such as joysticks, game controllers, keyboards, and so forth, to enable players to control characters within the virtual environment of the game. Additionally, certain modern video game systems can include a camera capable of tracking the movements of players, enabling players to control video game characters based on their movements. However, these systems typically suffer from issues with occlusion, in which a portion of a player is at least temporarily obscured from the camera and, as a result, the system is no longer able to accurately track the position or movements of the player. For example, occlusion can cause jittering or stuttering in the movements of the characters in the virtual environment, as well as other imprecise or erroneous translation of player actions into character actions within the game. Additionally, for multi-player video game systems, the potential for occlusion dramatically increases with the number of players.

BRIEF DESCRIPTION

Present embodiments are directed to an interactive video game system that includes at least one sensor and at least one display device disposed near a play area. The system also includes a controller communicatively coupled to the at least one sensor and the at least one display device, wherein the controller is configured to: receive, from the at least one sensor, the scanning data of the player in the play area; generate at least one model from the scanning data of the player; identify an action of the player in the play area based on the at least one model; generate the virtual representation for the player based on the at least one model and the action of the player; and present, on the display device, the virtual representation of the player in a virtual environment, wherein an action of the virtual representation is augmented relative to the action of the player.

Present embodiments are also directed to a method of operating an interactive video game system. The method includes: receiving, via processing circuitry of a controller of the interactive video game system, scanning data of a player positioned within a play area; generating, via the processing circuitry, a shadow model and a skeletal model of the player based on the scanning data; generating, via the processing circuitry, a virtual representation for the player based on the shadow model, wherein the virtual representation is associated with an augmented ability; identifying, via the processing circuitry, an action of the player in the play area based on the skeletal model, wherein the action triggers the augmented ability associated with the virtual representation; and presenting, via a display device of the interactive video game system, the virtual representation in a virtual environment performing the augmented ability.

Present embodiments are also directed to an interactive video game system, that includes a controller configured to: receive, from at least one sensor of the interactive video game system, scanning data of a player in a play area; generate a shadow model and a skeletal model from the scanning data of the player; generate a virtual representation for the player based on the shadow model; identify an action of the player in the play area based on the skeletal model of the player, wherein the action triggers an augmented ability associated with the virtual representation; and present, on a display device of the interactive video game system, the virtual representation in a virtual environment performing the augmented ability.

DRAWINGS

These and other features, aspects, and advantages of the present disclosure will become better understood when the following detailed description is read with reference to the accompanying drawings in which like characters represent like parts throughout the drawings, wherein.

Figure 5:
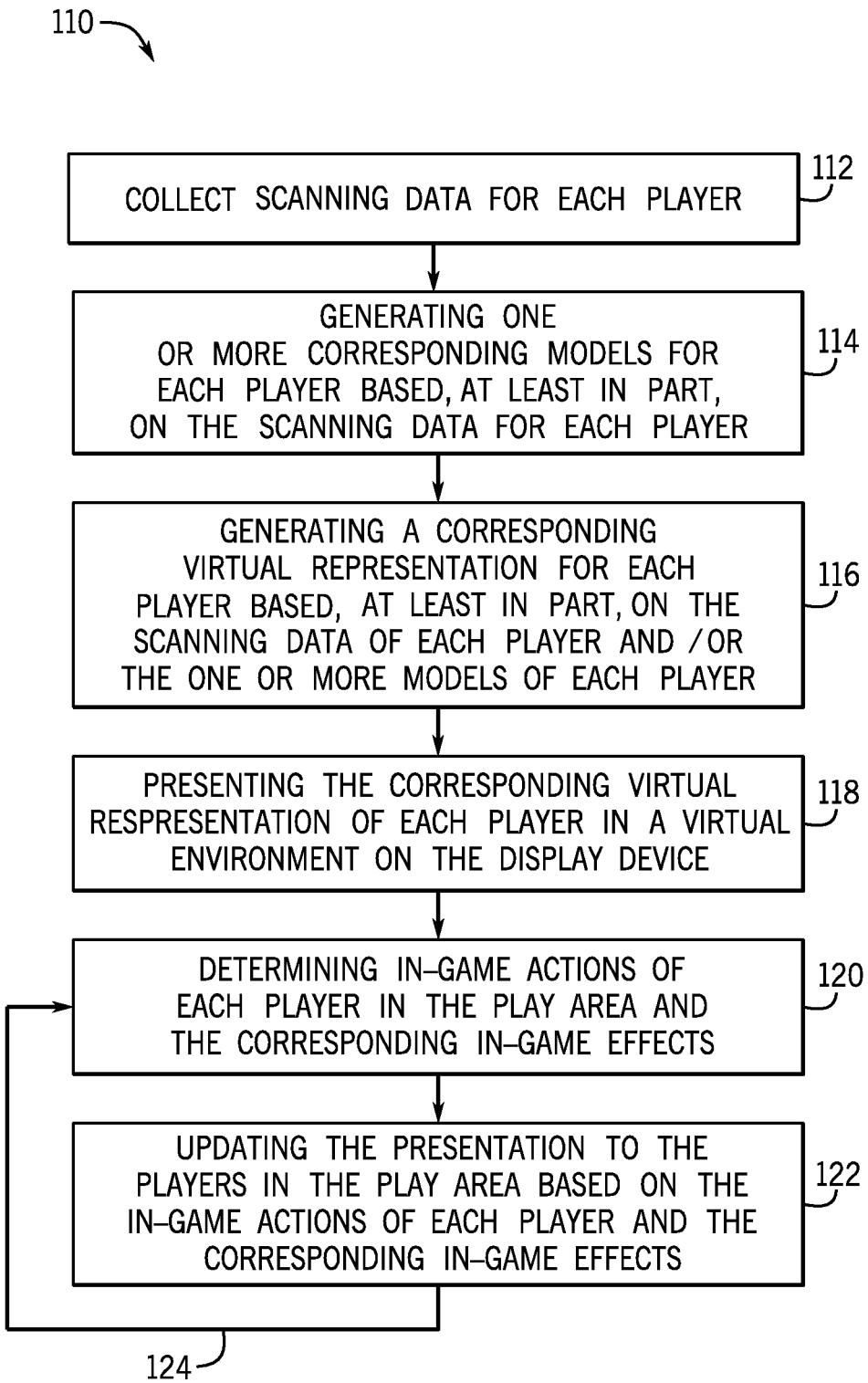
FIG. 5 is a flow diagram illustrating an embodiment of a process of operating the interactive game system, in accordance with the present technique.
Figure 6:
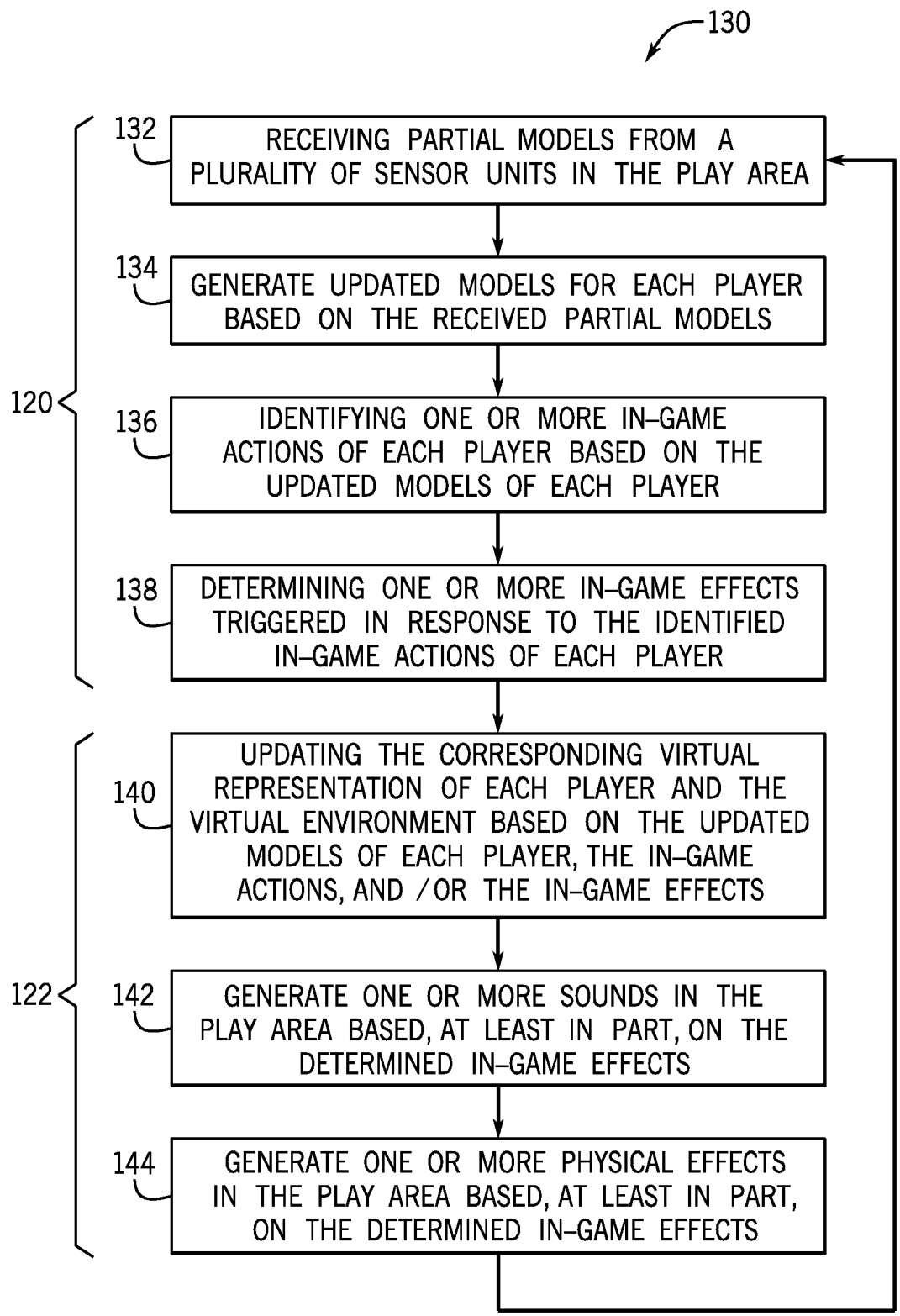

FIG. 6 is a flow diagram that illustrates an example embodiment of a process by which the interactive video game system performs certain actions indicated in the flow diagram of FIG. 5, in accordance with the present technique; and FIGS. 7, 8, 9, 10, 11, 12, and 13 respectively illustrate example embodiments of the interactive video game system that enable the generation of virtual representations having augmented appearance and/or movements relative to the detected appearance and/or movements of the player.

DETAILED DESCRIPTION

As used herein, "scanning data" refers to two-dimensional (2D) or three-dimensional (3D) collected by sensing (e.g., measuring, imaging, ranging) visible outer surfaces of players in a play area. More specifically, "volumetric scanning data," as used herein, refers to 3D scanning data, such as point cloud data, and may be contrasted with "2D scanning data," such as image data.

As used herein, a "player model" is a 2D or 3D model generated from the scanning data of a player that generally describes the outer surfaces of the player and may include texture data. More specifically, a "volumetric player model" or "volumetric model," as used herein, refers to a 3D player model generated from volumetric scanning data of a player, and may be contrasted with a "2D player model" that is generated from 2D scanning data of a player.

A "shadow model," as used herein, refers to a texture-less volumetric model of a player generated from the scanning data of a player, either directly or by way of the player model. As such, when presented on a 2D surface, such as a display device, the shadow model of a player has a shape substantially similar to a shadow or silhouette of the player when illuminated from behind.

A "skeletal model," as used herein, refers to a 3D model generated from the scanning data of a player that defines predicted locations and positions of certain bones (e.g., bones associated with the arms, legs, head, spine) of a player to describe the location and pose of the player within a play area. As such, the skeletal model is used to determine the movements and actions of players in the play area to trigger events in a virtual environment and/or in the play area.

Present embodiments are directed to an interactive video game system that enables multiple players (e.g., up to 12) to perform actions in a physical play area to control virtual representations of the players in a displayed virtual environment. The disclosed interactive video game system includes one or more sensors (e.g., cameras, light sensors, infrared (IR) sensors) disposed around the play area to capture scanning data (e.g., 2D or volumetric scanning data) of the players. For example, certain embodiments of the disclosed interactive video game system includes an array having two or more volumetric sensors, such as depth cameras and Light Detection and Ranging (LIDAR) devices, capable of volumetrically scanning each of the players. The system includes suitable processing circuitry that generates models (e.g., player models, shadow models, skeletal models) for each player based on the scanning data collected by the one or more sensors, as discussed below. During game play, one or more sensors capture the actions of the players in the play area, and the system determines the nature of these actions based on the generated player models. Accordingly, the interactive video game system continuously updates the virtual representations of the players and the virtual environment based on the actions of the players and their corresponding in-game effects.

As mentioned, the disclosed interactive video game system includes one or more sensors arranged around the play area to monitor the actions of the players within the play area. For example, in certain embodiments, an array including multiple sensors may be used to generally ensure that a skeletal model of each player can be accurately generated and updated throughout game play despite potential occlusion from the perspective of one or more sensors of the array. In other embodiments, fewer sensors may be used (e.g., a single camera), and the data may be processed using a machine-learning algorithm that generates complete skeletal models for the players despite potential occlusion. For such embodiments, the machine learning agent may be trained in advance using a corpus of scanning data in which the actual skeletal models of players are known (e.g., manually identified by a human, identified using another skeletal tracking algorithm) while portions of one or more players are occluded. As such, after training, the machine learning agent may then be capable of generating skeletal models of players from scanning data despite potential occlusion.

Additionally, the processing circuitry of the system may use the scanning data to generate aspects (e.g., size, shape, outline) of the virtual representations of each player within the virtual environment. In certain embodiments, certain aspects (e.g., color, texture, scale) of the virtual representation of each player may be further adjusted or modified based on information associated with the player. As discussed below, this information may include information related to game play (e.g., items acquired, achievements unlocked), as well as other information regarding activities of the player outside of the game (e.g., player performance in other games, items purchased by the player, locations visited by the player). Furthermore, the scanning data collected by the sensors can be used by the processing circuitry of the game system to generate additional content, such as souvenir images in which a player model is illustrated as being within the virtual world.

Furthermore, the processing circuitry of the system may use the scanning data to augment movements of the virtual representations of each player. For example, in certain embodiments, the processing circuitry of the system may use the scanning data to generate a skeletal model indicating that a player is moving or posing in a particular manner. In response, the processing circuitry may augment the virtual representation of the player to enable the virtual representation to move or change in a manner that goes beyond the actual movement or pose of the player, such that the motion and or appearance of the virtual representation is augmented or enhanced. For example, in an embodiment in which a virtual representation, such as a particular video game character, has particular enhanced abilities (e.g., an ability to jump extremely high, an ability to swim extremely fast, an ability to fly), then certain player movements or poses (e.g., a small hopping motion, a swim stroke through the air, a flapping motion) may be detected and may trigger these enhanced abilities in the virtual representations of the players. Accordingly, the disclosed interactive video game system enables immersive and engaging experience for multiple simultaneous players.

Figure 1:
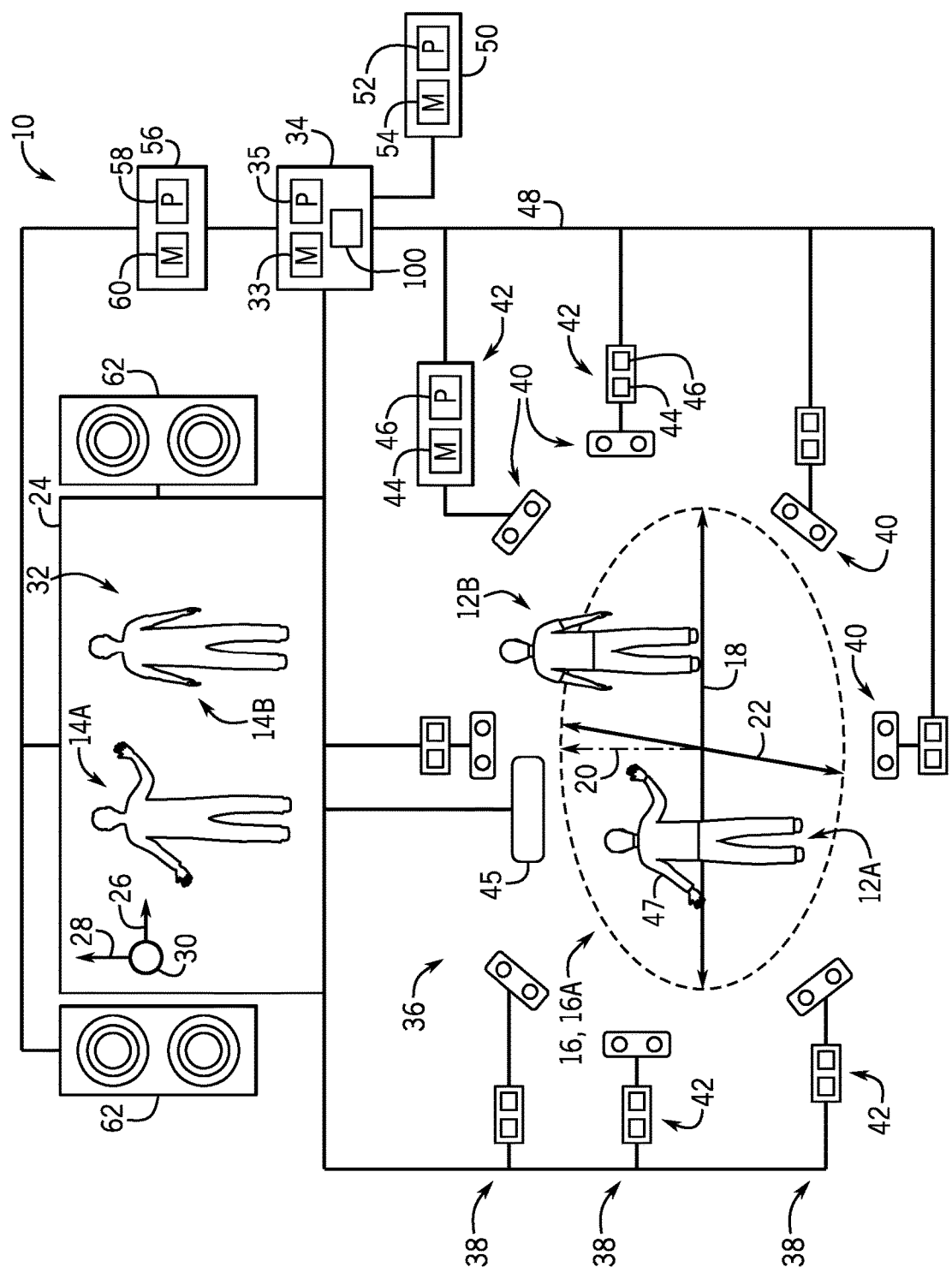
FIG. 1 is a schematic diagram of an embodiment of an interactive video game system that enables multiple players to control respective virtual representations by performing actions in a three-dimensional (3D) play area, in accordance with the present technique.

With the foregoing in mind, FIG. 1 is a schematic diagram of an embodiment of an interactive video game system 10 that enables multiple players 12 (e.g., players 12A and 12B) to control respective virtual representations 14 (e.g., virtual representations 14A and 14B), respectively, by performing actions in a play area 16. It may be noted that while, for simplicity, the present description is directed to two players 12 using the interactive video game system 10, in other embodiments, the interactive video game system 10 can support more than two (e.g., 6, 8, 10, 12, or more) players 12. The play area 16 of the interactive video game system 10 illustrated in FIG. 1 is described herein as being a 3D play area 16A. The term "3D play area" is used herein to refer to a play area 16 having a width (corresponding to an x-axis 18), a height (corresponding to a y-axis 20), and depth (corresponding to a z-axis 22), wherein the system 10 generally monitors the movements each of players 12 along the x-axis 18, y-axis 20, and z-axis 22. The interactive video game system 10 updates the location of the virtual representations 14 presented on a display device 24 along an x-axis 26, a y-axis 28, and z-axis 30 in a virtual environment 32 in response to the players 12 moving throughout the play area 16. While the 3D play area 16A is illustrated as being substantially circular, in other embodiments, the 3D play area 16A may be square shaped, rectangular, hexagonal, octagonal, or any other suitable 3D shape.

The embodiment of the interactive video game system 10 illustrated in FIG. 1 includes a primary controller 34, having memory circuitry 33 and processing circuitry 35, that generally provides control signals to control operation of the system 10. As such, the primary controller 34 is communicatively coupled to an array 36 of sensing units 38 disposed around the 3D play area 16A. More specifically, the array 36 of sensing units 38 may be described as symmetrically distributed around a perimeter of the play area 16. In certain embodiments, at least a portion of the array 36 of sensing units 38 may be positioned above the play area 16 (e.g., suspended from a ceiling or on elevated platforms or stands) and pointed at a downward angle to image the play area 16. In other embodiments, at least a portion of the array 36 of sensing units 38 may be positioned near the floor of the play area 16 and pointed at an upward angle to image the play area 16. In certain embodiments, the array 36 of the interactive video game system 10 may include at least two at least two sensing units 38 per player (e.g., players 12A and 12B) in the play area 16. Accordingly, in certain embodiments, the array 36 of sensing units 38 is suitably positioned to image a substantial portion of potential vantage points around the play area 16 to reduce or eliminate potential player occlusion. However, as mentioned above, and other embodiments, the array 36 may include fewer sensing units 38 (e.g., a single sensing unit), and the processing circuitry 35 may rely on a machine learning agent to deal with potential occlusion situations.

In the illustrated embodiment, each sensing unit 38 includes a respective sensor 40, which may be a volumetric sensor (e.g., an infra-red (IR) depth camera, a LIDAR device, or another suitable ranging device) or a 2D imaging device (e.g. an optical camera). For example, in certain embodiments, all of the sensors 40 of the sensing units 38 in the array 36 are either IR depth cameras or LIDAR devices, while in other embodiments, a mixture of both IR depth cameras, LIDAR devices, and/or optical cameras are present within the array 36. It is presently recognized that both IR depth cameras and LIDAR devices can be used to volumetrically scan each of the players 12, and the collected volumetric scanning data can be used to generate various models of the players, as discussed below. For example, in certain embodiments, IR depth cameras in the array 36 may be used to collect data to generate skeletal models, while the data collected by LIDAR devices in the array 36 may be used to generate player models and/or shadow models for the players 12, which is discussed in greater detail below. It is also recognized that LIDAR devices, which collect point cloud data, are generally capable of scanning and mapping a larger area than depth cameras, typically with better accuracy and resolutions. As such, in certain embodiments, at least one sensing unit 38 of the array 36 includes a corresponding volumetric sensor 40 that is a LIDAR device to enhance the accuracy or resolution of the array 36 and/or to reduce a total number of sensing units 38 present in the array 36.

Further, each illustrated sensing unit 38 includes a sensor controller 42 having suitable memory circuitry 44 and processing circuitry 46. The processing circuitry 46 of each sensing unit 38 executes instructions stored in the memory circuitry 44 to enable the sensing unit 38 to scan the players 12 to generate scanning data (e.g., volumetric and/or 2D scanning data) for each of the players 12. For example, in the illustrated embodiment, the sensing units 38 are communicatively coupled to the primary controller 34 via a high-speed internet protocol (IP) network 48 that enables low-latency exchange of data between the devices of the interactive video game system 10. Additionally, in certain embodiments, the sensing units 38 may each include a respective housing that packages the sensor controller 42 together with the sensor 40.

It may be noted that, in other embodiments, the sensing units 38 may not include a respective sensor controller 42. For such embodiments, the processing circuitry 35 of the primary controller 34, or other suitable processing circuitry of the system 10, is communicatively coupled to the respective sensors 40 of the array 36 to provide control signals directly to, and to receive data signals directly from, the sensors 40. However, it is presently recognized that processing (e.g., filtering, skeletal mapping) the volumetric scanning data collected by each of these sensors 40 can be processor-intensive. As such, in certain embodiments, it can be advantageous to divide the workload by utilizing dedicated processors (e.g., processors 46 of each of the sensor controllers 42) to process the scanning data collected by the respective sensor 40, and then to send processed data to the primary controller 34. For example, in the illustrated embodiment, each of processors 46 of the sensor controllers 42 process the scanning data collected by their respective sensor 40 to generate partial models (e.g., partial volumetric or 2D models, partial skeletal models, partial shadow models) of each of the players 12, and the processing circuitry 35 of the primary controller 34 receives and fuses or combines the partial models to generate complete models of each of the players 12, as discussed below.

Additionally, in certain embodiments, the primary controller 34 may also receive information from other sensing devices in and around the play area 16. For example, the illustrated primary controller 34 is communicatively coupled to a radio-frequency (RF) sensor 45 disposed near (e.g., above, below, adjacent to) the 3D play area 16A. The illustrated RF sensor 45 receives a uniquely identifying RF signal from a wearable device 47, such as a bracelet or headband having a radio-frequency identification (RFID) tag worn by each of the players 12. In response, the RF sensor 45 provides signals to the primary controller 34 regarding the identity and the relative positions of the players 12 in the play area 16. As such, for the illustrated embodiment, processing circuitry 35 of the primary controller 34 receives and combines the data collected by the array 36, and potentially other sensors (e.g., RF sensor 45), to determine the identities, locations, and actions of the players 12 in the play area 16 during game play. Additionally, the illustrated primary controller 34 is communicatively coupled to a database system 50, or any other suitable data repository storing player information. The database system 50 includes processing circuitry 52 that executes instructions stored in memory circuitry 54 to store and retrieve information associated with the players 12, such as various models (e.g., player, shadow, and/or skeletal models) associated with the player, player statistics (e.g., wins, losses, points, total game play time), player attributes or inventory (e.g., abilities, textures, items), player purchases at a gift shop, player points in a loyalty rewards program, and so forth. The processing circuitry 35 of the primary controller 34 may query, retrieve, and update information stored by the database system 50 related to the players 12 to enable the system 10 to operate as set forth herein.

Additionally, the embodiment of the interactive video game system 10 illustrated in FIG. 1 includes an output controller 56 that is communicatively coupled to the primary controller 34. The output controller 56 generally includes processing circuitry 58 that executes instructions stored in memory circuitry 60 to control the output of stimuli (e.g., audio signals, video signals, lights, physical effects) that are observed and experienced by the players 12 in the play area 16. As such, the illustrated output controller 56 is communicatively coupled to audio devices 62 and display device 24 to provide suitable control signals to operate these devices to provide particular output. In other embodiments, the output controller 56 may be coupled to any suitable number of audio and/or display devices. The display device 24 may be any suitable display device, such as a projector and screen, a flat-screen display device, or an array of flat-screen display devices, which is arranged and designed to provide a suitable view of the virtual environment 32 to the players 12 in the play area 16. In certain embodiments, the audio devices 62 may be arranged into an array about the play area 16 to increase player immersion during game play. For example, in certain embodiments, each of the audio devices 62 (e.g., each speaker) in such an array is independently controllable by the primary controller 34 to enable each of the players 12 to hear different sounds relative to the other players and unique to their own actions. In still other embodiments, the play area 16 may include robotic elements (e.g., androids, robotic animals, and so forth) that may be actuated in the real world in response to signals provided by the output controller based on the actions of the players during gameplay. For example, in addition or an alternative to the virtual representation of the player presented on the display device 24, robotic representations of players 12 provide non-virtual representations that are controlled responsive to the movements and behavior of the players 12 in the play area 16. In other embodiments, the system 10 may not include the output controller 56, and the processing circuitry 35 of the primary controller 34 may be communicatively coupled to the audio devices 62, display device 24, and so forth, to generate the various stimuli for the players 12 in the play area 16 to observe and experience.

Figure 2:
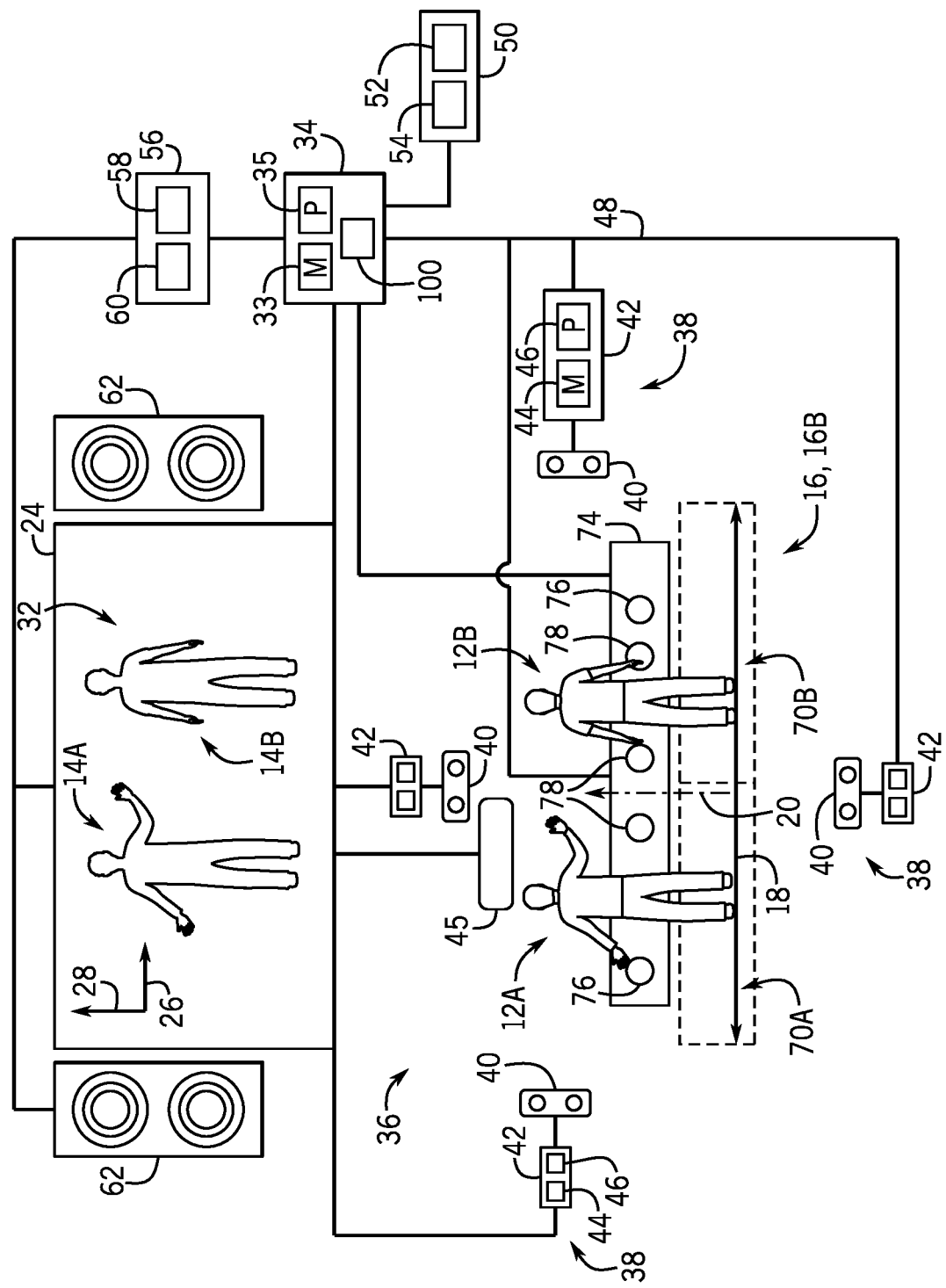
FIG. 2 is a schematic diagram of another embodiment of the interactive video game system having a two-dimensional (2D) play area, in accordance with the present technique.

FIG. 2 is a schematic diagram of another embodiment of the interactive video game system 10, which enables multiple players 12 (e.g., player 12A and 12B) to control virtual representations 14 (e.g., virtual representations 14A and 14B) by performing actions in the play area 16. The embodiment of the interactive video game system 10 illustrated in FIG. 2 includes many of the features discussed herein with respect to FIG. 1, including the primary controller 34, the array 36 of sensing units 38, the output controller 56, and the display device 24. However, the embodiment of the interactive video game system 10 illustrated in FIG. 2 is described herein as having a 2D play area 16B. The term "2D play area" is used herein to refer to a play area 16 having a width (corresponding to the x-axis 18) and a height (corresponding to the y-axis 20), wherein the system 10 generally monitors the movements each of players 12 along the x-axis 18 and y-axis 20. For the embodiment illustrated in FIG. 2, the players 12A and 12B are respectively assigned sections 70A and 70B of the 2D play area 16B, and the players 12 do not wander outside of their respective assigned sections during game play. However, it may be appreciated that other embodiments of the interactive video game system 10 may include a sufficient number of sensors (e.g. LIDAR sensors, or other suitable sensors 40, located above the players) that each of the players 12 can be continuously tracked as they freely move around the entire play area 16B while the system accounts for potential occlusion by other players as they move. The interactive video game system 10 updates the location of the virtual representations 14 presented on the display device 24 along the x-axis 26 and the y-axis 28 in the virtual environment 32 in response to the players 12 moving (e.g., running along the x-axis 18, jumping along the y-axis 20) within the 2D play area 16B. As mentioned, in certain embodiments, the array 36 may include fewer sensors (e.g., a single camera).

Additionally, the embodiment of the interactive video game system 10 illustrated in FIG. 2 includes an interface panel 74 that can enable enhanced player interactions. As illustrated in FIG. 2, the interface panel 74 includes a number of input devices 76 (e.g., cranks, wheels, buttons, sliders, blocks) that are designed to receive input from the players 12 during game play. As such, the illustrated interface panel 74 is communicatively coupled to the primary controller 34 to provide signals to the controller 34 indicative of how the players 12 are manipulating the input devices 76 during game play. The illustrated interface panel 74 also includes a number of output devices 78 (e.g., audio output devices, visual output devices, physical stimulation devices) that are designed to provide audio, visual, and/or physical stimuli to the players 12 during game play. As such, the illustrated interface panel 74 is communicatively coupled to the output controller 56 to receive control signals and to provide suitable stimuli to the players 12 in the play area 16 in response to suitable signals from the primary controller 34. For example, the output devices 78 may include audio devices, such as speakers, horns, sirens, and so forth. Output devices 78 may also include visual devices such as lights or display devices of the interface panel 74.

In certain embodiments, the output devices 78 of the interface panel 74 include physical effect devices, such as an electronically controlled release valve coupled to a compressed air line, which provides burst of warm or cold air or mist in response to a suitable control signal from the primary controller 34 or the output controller 56. It may be appreciated that the output devices are not limited to those incorporated into the interface panel 74. In certain embodiments, the play area 16 may include output devices that provide physical effects to players indirectly, such as through the air. For example, in an embodiment, when a player strikes a particular pose to trigger an ability or an action of the virtual representation, then the player may experience a corresponding physical effect. By way of specific example, in an embodiment in which a player has the ability to throw snowballs, the player may receive a cold blast of air on their exposed palm in response to the player extending their hands in a particular manner. In an embodiment in which a player has the ability to throw fireballs, the player may receive a warm blast of air or IR irradiation (e.g., heat) in response to the player extending their hands in a particular manner. In still other embodiments, players may receive haptic feedback (e.g., ultrasonic haptic feedback) in response to the virtual representation of a player interacting with an object in the virtual world. For example, when the virtual representation of the player hits a wall with a punch in the virtual environment, the player may receive some physically perceptible effect on a portion of their body (e.g., an extended first) that corresponds to the activity in the virtual environment.

As illustrated in FIG. 2, the array 36 of sensing units 38 disposed around the 2D play area 16B of the illustrated embodiment of the interactive video game system 10 includes at least one sensing unit 38. That is, while certain embodiments of the interactive video game system 10 illustrated in FIG. 1 include the array 36 having at least two sensing units 38 per player, embodiments of the interactive video game system 10 illustrated in FIG. 2 include the array 36 having as few one sensing unit 38 regardless of the number of players. In certain embodiments, the array 36 may include at least two sensing units disposed at right angles (90°) with respect to the players 12 in the 2D play area 16B. In certain embodiments, the array 36 may additionally or alternatively include at least two sensing units disposed on opposite sides (180°) with respect to the players 12 in the play area 16B. By way of specific example, in certain embodiments, the array 36 may include only two sensing units 38 disposed on different (e.g., opposite) sides of the players 12 in the 2D play area 16B.

As mentioned, the array 36 illustrated in FIGS. 1 and 2 is capable of collecting scanning data (e.g., volumetric or 2D scanning data) for each of the players 12 in the play area 16. In certain embodiments, the collected scanning data can be used to generate various models (e.g., player, shadow, skeletal) for each players, and these models can be subsequently updated based on the movements of the players during game play, as discussed below. However, it is presently recognized that using volumetric models that include texture data is substantially more processor intensive (e.g., involves additional filtering, additional data processing) than using shadow models that lack this texture data. For example, in certain embodiments, the processing circuitry 35 of the primary controller 34 can generate a shadow model for each of the players 12 from scanning data (e.g., 2D scanning data) collected via the array 36 by using edge detection techniques to differentiate between the edges of the players 12 and their surroundings in the play area 16. It is presently recognized that such edge detection techniques are substantially less processor-intensive and involve substantially less filtering than using a volumetric model that includes texture data. As such, it is presently recognized that certain embodiments of the interactive video game system 10 generate and update shadow models instead of volumetric models that include texture, enabling a reduction in the size, complexity, and cost of the processing circuitry 35 of the primary controller 34. Additionally, as discussed below, the processing circuitry 35 can generate the virtual representations 14 of the players 12 based, at least in part, on the generated shadow models.

Figure 3:
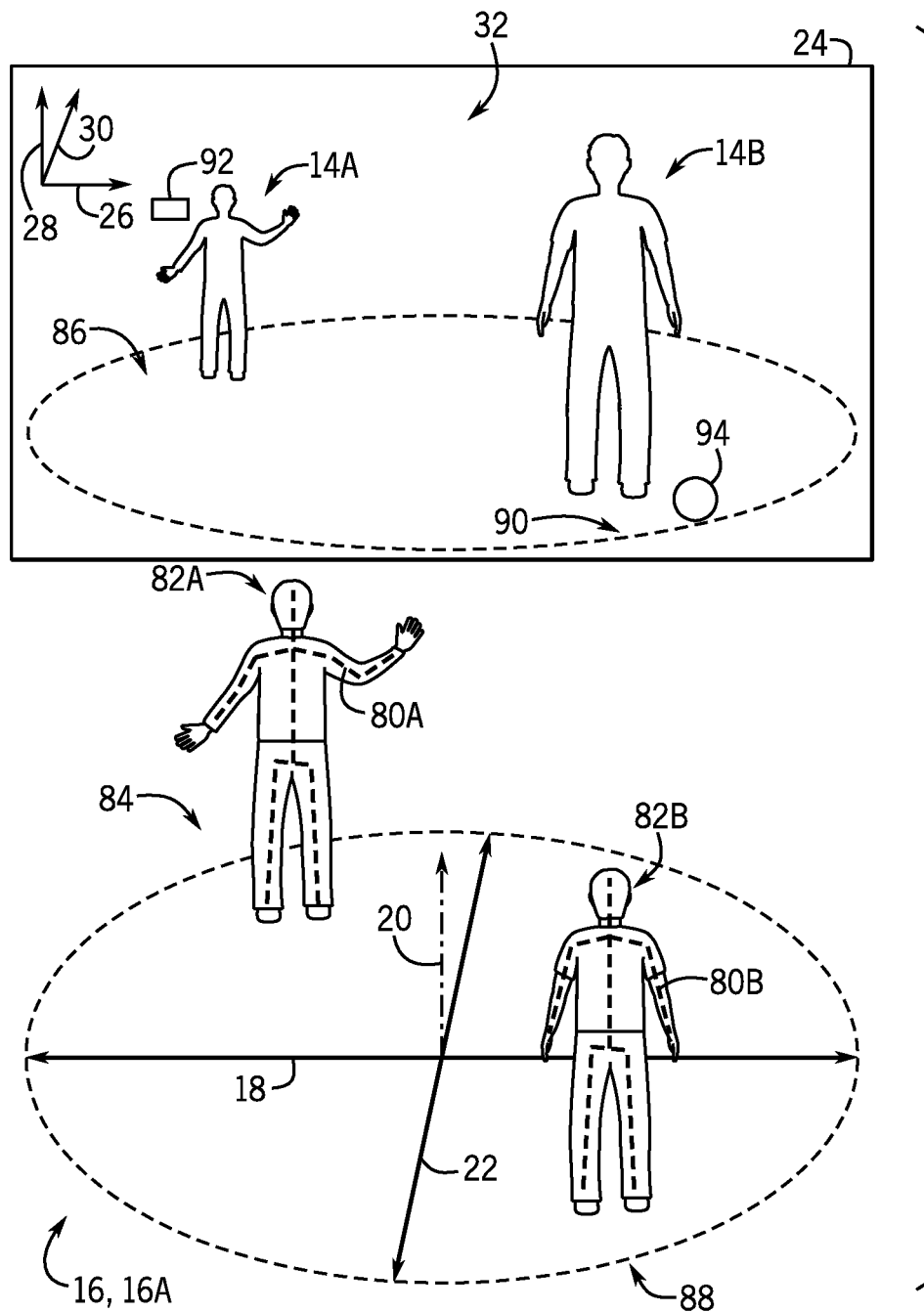
FIG. 3 is a diagram illustrating an example of skeletal and shadow models representative of players in the 3D play area, as well as corresponding virtual representations of the players presented in the virtual environment, in accordance with the present technique.

As mentioned, the scanning data collected by the array 36 of the interactive video game system 10 can be used to generate various models (e.g., a 2D or volumetric player model, a shadow model, a skeletal model) for each player. For example, FIG. 3 is a diagram illustrating skeletal models 80 (e.g., skeletal models 80A and 80B) and shadow models 82 (e.g., shadow models 82A and 82B) representative of players in the 3D play area 16A. FIG. 3 also illustrates corresponding virtual representations 14 (e.g., virtual representations 14A and 14B) of these players presented in the virtual environment 32 on the display device 24, in accordance with the present technique. As illustrated, the represented players are located at different positions within the 3D play area 16A of the interactive video game system 10 during game play, as indicated by the locations of the skeletal models 80 and the shadow models 82. The illustrated virtual representations 14 of the players in the virtual environment 32 are generated, at least in part, based on the shadow models 82 of the players. As the players move within the 3D play area 16A, as mentioned above, the primary controller 34 tracks these movements and accordingly generates updated skeletal models 80 and shadow models 82, as well as the virtual representations 14 of each player.

Additionally, embodiments of the interactive video game system 10 having the 3D play area 16A, as illustrated in FIGS. 1 and 3, enable player movement and tracking along the z-axis 22 and translates it to movement of the virtual representations 14 along the z-axis 30. As illustrated in FIG. 3, this enables the player represented by the skeletal model 80A and shadow model 82A and to move a front edge 84 of the 3D play area 16A, and results in the corresponding virtual representation 14A being presented at a relatively deeper point or level 86 along the z-axis 30 in the virtual environment 32. This also enables the player represented by skeletal model 80B and the shadow model 82B to move to a back edge 88 of the 3D play area 16A, which results in the corresponding virtual representation 14B being presented at a substantially shallower point or level 90 along the z-axis 30 in the virtual environment 32. Further, for the illustrated embodiment, the size of the presented virtual representations 14 is modified based on the position of the players along the z-axis 22 in the 3D play area 16A. That is, the virtual representation 14A positioned relatively deeper along the z-axis 30 in the virtual environment 32 is presented as being substantially smaller than the virtual representation 14B positioned at a shallower depth or layer along the z-axis 30 in the virtual environment 32.

It may be noted that, for embodiments of the interactive video game system 10 having the 3D player area 16A, as represented in FIGS. 1 and 3, the virtual representations 14 may only be able to interact with virtual objects that are positioned at a similar depth along the z-axis 30 in the virtual environment 32. For example, for the embodiment illustrated in FIG. 3, the virtual representation 14A is capable of interacting with a virtual object 92 that is positioned deeper along the z-axis 30 in the virtual environment 32, while the virtual representation 14B is capable of interacting with another virtual object 94 that is positioned a relatively shallower depth along the z-axis 30 in the virtual environment 32. That is, the virtual representation 14A is not able to interact with the virtual object 94 unless that player represented by the models 80A and 82A changes position along the z-axis 22 in the 3D play area 16A, such that the virtual representation 14A moves to a similar depth as the virtual object 94 in the virtual environment 32.

Figure 4:
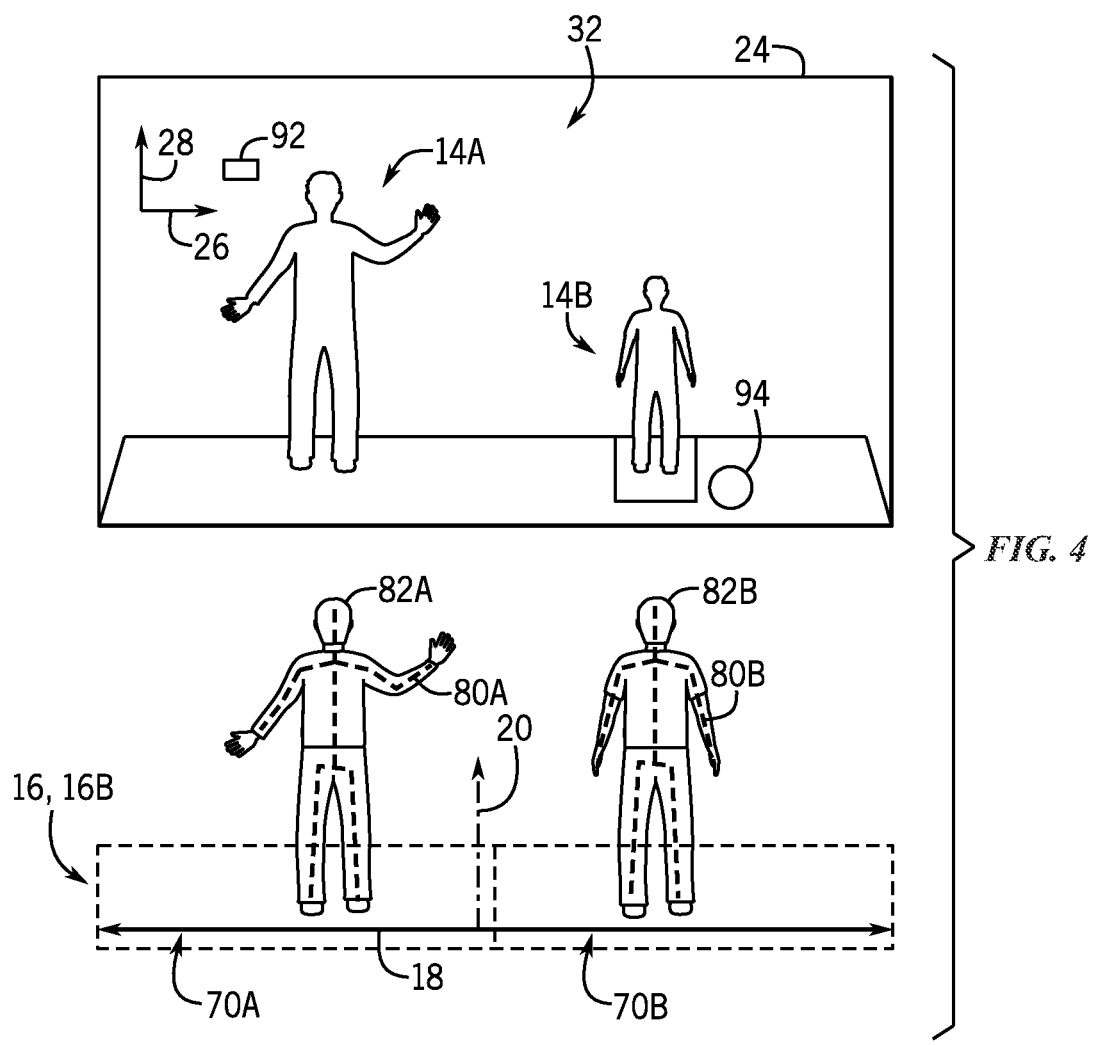
FIG. 4 is a diagram illustrating an example of skeletal and shadow models representative of players in the 2D play area, as well as corresponding virtual representations of the players presented in the virtual environment, in accordance with the present technique.

For comparison, FIG. 4 is a diagram illustrating an example of skeletal models 80 (e.g., skeletal models 80A and 80B) and shadow models 82 (e.g., shadow models 82A and 82B) representative of players in the 2D play area 16B. FIG. 4 also illustrates virtual representations 14 (e.g., virtual representations 14A and 14B) of the players presented on the display device 24. As the players move within the 2D play area 16B, as mentioned above, the primary controller 34 tracks these movements and accordingly updates the skeletal models 80, the shadow models 82, and the virtual representations 14 of each player. As mentioned, embodiments of the interactive video game system 10 having the 2D play area 16B illustrated in FIGS. 2 and 4 do not track player movement along a z-axis (e.g., z-axis 22 illustrated in FIGS. 1 and 3). Instead, for embodiments with the 2D play area 16B, the size of the presented virtual representations 14 may be modified based on a status or condition of the players inside and/or outside of game play. For example, in FIG. 4, the virtual representation 14A is substantially larger than the virtual representation 14B. In certain embodiments, the size of the virtual representations 14A and 14B may be enhanced or exaggerated in response to the virtual representation 14A or 14B interacting with a particular item, such as in response to the virtual representation 14A obtaining a power-up during a current or previous round of game play. In other embodiments, the exaggerated size of the virtual representation 14A, as well as other modifications of the virtual representations (e.g., texture, color, transparency, items worn or carried by the virtual representation), may be the result of the corresponding player interacting with objects or items outside of the interactive video game system 10, as discussed below.

It is presently recognized that embodiments of the interactive video game system 10 that utilize a 2D play area 16B, as represented in FIGS. 2 and 4, enable particular advantages over embodiments of the interactive video game system 10 that utilize the 3D play area 16A, as illustrated in FIG. 1. For example, as mentioned, the array 36 of sensing units 38 in the interactive video game system 10 having the 2D play area 16B, as illustrated in FIG. 2, includes fewer sensing units 38 than the interactive video game system 10 with the 3D play area 16A, as illustrated in FIG. 1. That is, depth (e.g., location and movement along the z-axis 22, as illustrated in FIG. 1) is not tracked for the interactive video game system 10 having the 2D play area 16B, as represented in FIGS. 2 and 4. Additionally, since players 12A and 12B remain in their respective assigned sections 70A and 70B of the 2D play area 16B, the potential for occlusion is substantially reduced. For example, by having players remain within their assigned sections 70 of the 2D play area 16B occlusion between players only occurs predictably along the x-axis 18. As such, by using the 2D play area 16B, the embodiment of the interactive video game system 10 illustrated in FIG. 2 enables the use of a smaller array 36 having fewer sensing units 38 to track the players 12, compared to the embodiment of the interactive video game system 10 of FIG. 1.

Accordingly, it is recognized that the smaller array 36 of sensing units 38 used by embodiments of the interactive video game system 10 having the 2D play area 16B also generate considerably less data to be processed than embodiments having the 3D play area 16A. For example, because occlusion between players 12 is significantly more limited and predictable in the 2D play area 16B of FIGS. 2 and 4, fewer sensing units 38 can be used in the array 36 while still covering a substantial portion of potential vantage points around the play area 16. As such, for embodiments of the interactive video game system 10 having the 2D play area 16B, the processing circuitry 35 of the primary controller 34 may be smaller, simpler, and/or more energy efficient, relative to the processing circuitry 35 of the primary controller 34 for embodiments of the interactive video game system 10 having the 3D play area 16A.

As mentioned, the interactive video game system 10 is capable of generating various models of the players 12. More specifically, in certain embodiments, the processing circuitry 35 of the primary controller 34 is configured to receive partial model data (e.g., partial player, shadow, and/or skeletal models) from the various sensing units 38 of the array 36 and fuse the partial models into complete models (e.g., complete volumetric, shadow, and/or skeletal models) for each of the players 12. Set forth below is an example in which the processing circuitry 35 of the primary controller 34 fuses partial skeletal models received from the various sensing units 38 of the array 36. It may be appreciated that, in certain embodiments, the processing circuitry 35 of the primary controller 34 may use a similar process to fuse partial shadow model data into a shadow model and/or to fuse partial volumetric model data.

In an example, partial skeletal models are generated by each sensing unit 38 of the interactive video game system 10 and are subsequently fused by the processing circuitry 35 of the primary controller 34. In particular, the processing circuitry 35 may perform a one-to-one mapping of corresponding bones of each of the players 12 in each of the partial skeletal models generated by different sensing units 38 positioned at different angles (e.g., opposite sides, perpendicular) relative to the play area 16. In certain embodiments, relatively small differences between the partial skeletal models generated by different sensing units 38 may be averaged when fused by the processing circuitry 35 to provide smoothing and prevent jerky movements of the virtual representations 14. Additionally, when a partial skeletal model generated by a particular sensing unit differs significantly from the partial skeletal models generated by at least two other sensing units, the processing circuitry 35 of the primary controller 34 may determine the data to be erroneous and, therefore, not include the data in the skeletal models 80. For example, if a particular partial skeletal model is missing a bone that is present in the other partial skeletal models, then the processing circuitry 35 may determine that the missing bone is likely the result of occlusion, and may discard all or some of the partial skeletal model in response.

It may be noted that precise coordination of the components of the interactive video game system 10 is desirable to provide smooth and responsive movements of the virtual representations 14 in the virtual environment 32. In particular, to properly fuse the partial models (e.g., partial skeletal, volumetric, and/or shadow models) generated by the sensing units 38, the processing circuitry 35 may consider the time at which each of the partial models is generated by the sensing units 38. In certain embodiments, the interactive video game system 10 may include a system clock 100, as illustrated in FIGS. 1 and 2, which is used to synchronize operations within the system 10. For example, the system clock 100 may be a component of the primary controller 34 or another suitable electronic device that is capable of generating a time signal that is broadcast over the network 48 of the interactive video game system 10. In certain embodiments, various devices coupled to the network 48 may receive and use a time signal to adjust respective clocks at particular times (e.g., at the start of game play), and the devices may subsequently include timing data based on signals from these respective clocks when providing game play data to the primary controller 34. In other embodiments, the various devices coupled to the network 48 continually receive the time signal from the system clock 100 (e.g., at regular microsecond intervals) throughout game play, and the devices subsequently include timing data from the time signal when providing data (e.g., volumetric scanning data, partial model data) to the primary controller 34. Additionally, the processing circuitry 35 of the primary controller 34 can determine whether a partial model (e.g., a partial volumetric, shadow, or skeletal model) generated by a sensing unit 38 is sufficiently fresh (e.g., recent, contemporary with other data) to be used to generate or update the complete model, or if the data should be discarded as stale. Accordingly, in certain embodiments, the system clock 100 enables the processing circuitry 35 to properly fuse the partial models generated by the various sensing units 38 into suitable volumetric, shadow, and/or skeletal models of the players 12.

FIG. 5 is a flow diagram illustrating an embodiment of a process 110 for operating the interactive video game system 10, in accordance with the present technique. It may be appreciated that, in other embodiments, certain steps of the illustrated process 110 may be performed in a different order, repeated multiple times, or skipped altogether, in accordance with the present disclosure. The process 110 illustrated in FIG. 5 may be executed by the processing circuitry 35 of the primary controller 34 alone, or in combination with other suitable processing circuitry (e.g., processing circuitry 46, 52, and/or 58) of the system 10.

The illustrated embodiment of the process 110 begins with the interactive video game system 10 collecting (block 112) a scanning data for each player. In certain embodiments, as illustrated in FIGS. 1-4, the players 12 may be scanned or imaged by the sensing units 38 positioned around the play area 16. For example, in certain embodiments, before game play begins, the players 12 may be prompted to strike a particular pose, while the sensing units 38 of the array 36 collect scanning data (e.g., volumetric and/or 2D scanning data) regarding each player. In other embodiments, the players 12 may be volumetrically scanned by a separate system prior to entering the play area 16. For example, a line of waiting players may be directed through a pre-scanning system (e.g., similar to a security scanner at an airport) in which each player is individually scanned (e.g., while striking a particular pose) to collect the scanning data for each player. In certain embodiments, the pre-scanning system may be a smaller version of the 3D play area 16A illustrated in FIG. 1 or the 2D play area 16B in FIG. 2, in which an array 36 including one or more sensing units 38 are positioned about an individual player to collect the scanning data. In other embodiments, the pre-scanning system may include fewer sensing units 38 (e.g., 1, 2, 3) positioned around the individual player, and the sensing units 38 are rotated around the player to collect the complete scanning data. It is presently recognized that it may be desirable to collect the scanning data indicated in block 112 while the players 12 are in the play area 16 to enhance the efficiency of the interactive video game system 10 and to reduce player wait times.

Next, the interactive video game system 10 generates (block 114) corresponding models for each player based on the scanning data collected for each player. As set forth above, in certain embodiments, the processing circuitry 35 of the primary controller may receive partial models for each of the players from each of the sensing units 38 in the array 36, and may suitably fuse these partial models to generate suitable models for each of the players. For example, the processing circuitry 35 of the primary controller 34 may generate a player model (e.g., a volumetric or 2D player model) for each player that generally defines a 2D or 3D shape of each player. Additionally or alternatively, the processing circuitry 35 of the primary controller 34 may generate a shadow model for each player that generally defines a texture-less 3D shape of each player. Furthermore, the processing circuitry 35 may also generate a skeletal model that generally defines predicted skeletal positions and locations of each player within the play area.

Continuing through the example process 110, next, the interactive video game system 10 generates (block 116) a corresponding virtual representation for each player based, at least in part on, the on the scanning data collected for each player and/or one or more the models generated for each player. For example, in certain embodiments, the processing circuitry 35 of the primary controller 34 may use a shadow model generated in block 114 as a basis to generate a virtual representation of a player. It may be appreciated that, in certain embodiments, the virtual representations 14 may have a shape or outline that is substantially similar to the shadow model of the corresponding player, as illustrated in FIGS. 3 and 4. In addition to shape, the virtual representations 14 may have other properties that can be modified to correspond to properties of the represented player. For example, a player may be associated with various properties (e.g., items, statuses, scores, statistics) that reflect their performance in other game systems, their purchases in a gift shop, their membership to a loyalty program, and so forth. Accordingly, properties (e.g., size, color, texture, animations, presence of virtual items) of the virtual representation may be set in response to the various properties associated with the corresponding player, and further modified based on changes to the properties of the player during game play. Also, a corresponding virtual representation for a player may be based only partially on the scanning data and/or the shadow model generated for the player, such that the virtual representation includes enhanced and/or modified visual characteristics relative to the actual appearance of the player. For example, in an embodiment, for a player in a seated position (e.g., seated in a chair or a wheel chair), a virtual representation may be generated in which an upper portion of the virtual representation includes a realistic, silhouette (e.g., based on the shadow model of the player), while a lower portion of the virtual representation is illustrated in an alternative or abstract manner (e.g., as a floating cloud). In another embodiment, the upper portion of the body of the virtual representation includes a realistic, silhouette (e.g., based on the shadow model of the player), while a lower portion of the body of the virtual representation is illustrated as that of a horse, yielding a centaur-like virtual representation. In such embodiments, the lower horse portion of the virtual representation may move like a horse in a manner that corresponds to (e.g., is synchronized with) movement of the feet of the player in a directly correlated or an augmented fashion, as discussed in greater detail below.

It may be noted that, in certain embodiments, the virtual representations 14 of the players 12 may not have an appearance or shape that substantially resembles the generated player or shadow models. For example, in certain embodiments, the interactive video game system 10 may include or be communicatively coupled to a pre-generated library of virtual representations that are based on fictitious characters (e.g., avatars), and the system may select particular virtual representations, or provide recommendations of particular selectable virtual representations, for a player generally based on the generated player or shadow model of the player. For example, if the game involves a larger hero and a smaller sidekick, the interactive video game system 10 may select or recommend from the pre-generated library a relatively larger hero virtual representation for an adult player and a relatively smaller sidekick virtual representation for a child player.

The process 110 continues with the interactive video game system 10 presenting (block 118) the corresponding virtual representations 14 of each of the players in the virtual environment 32 on the display device 24. In addition to presenting, in certain embodiments, the actions in block 118 may also include presenting other introductory presentations, such as a welcome message or orientation/instructional information, to the players 12 in the play area 16 before game play begins. Furthermore, in certain embodiments, the processing circuitry 35 of the primary controller 34 may also provide suitable signals to set or modify parameters of the environment within the play area 16. For example, these modifications may include adjusting house light brightness and/or color, playing game music or game sound effects, adjusting the temperature of the play area, activating physical effects in the play area, and so forth.

Once game play begins, the virtual representations 14 generated in block 116 and presented in block 118 are capable of interacting with one another and/or with virtual objects (e.g., virtual objects 92 and 94) in the virtual environment 32, as discussed herein with respect to FIGS. 3 and 4. During game play, the interactive video game system 10 generally determines (block 120) the in-game actions of each of the players 12 in the play area 16 and the corresponding in-game effects of these in-game actions. Additionally, the interactive video game system 10 generally updates (block 122) the corresponding virtual representations 14 of the players 12 and/or the virtual environment 32 based on the in-game actions of the players 12 in the play area 16 and the corresponding in-game effects determined in block 120. As indicated by the arrow 124, the interactive video game system 10 may repeat the steps indicated in block 120 and 122 until game play is complete, for example, due to one of the players 12 winning the round of game play or due to an expiration of an allotted game play time.

FIG. 6 is a flow diagram that illustrates an example embodiment of a more detailed process 130 by which the interactive video game system 10 performs the actions indicated in blocks 120 and 122 of FIG. 5. That is, the process 130 indicated in FIG. 6 includes a number of steps to determine the in-game actions of each player in the play area and the corresponding in-game effects of these in-game actions, as indicated by the bracket 120, as well as a number of steps to update the corresponding virtual representation of each player and/or the virtual environment, as indicated by the bracket 122. In certain embodiments, the actions described in the process 130 may be encoded as instructions in a suitable memory, such as the memory circuitry 33 of the primary controller 34, and executed by a suitable processor, such as the processing circuitry 35 of the primary controller 34, of the interactive video game system 10. It should be noted that the illustrated process 130 is merely provided as an example, and that in other embodiments, certain actions described may be performed in different orders, may be repeated, or may be skipped altogether.

The process 130 of FIG. 6 begins with the processing circuitry 35 receiving (block 132) partial models from a plurality of sensing units in the play area. As discussed herein with respect to FIGS. 1 and 2, the interactive video game system 10 includes the array 36 of sensing units 38 disposed in different positions around the play area 16, and each of these sensing units 38 is configured to generate one or more partial models (e.g. partial player, shadow, and/or skeletal models) for at least a portion of the players 12. Additionally, as mentioned, the processing circuitry 35 may also receive data from other devices (e.g., RF sensor 45, input devices 76) regarding the actions of the players 16 disposed within the play area 16. Further, as mentioned, these partial models may be timestamped based on a signal from the clock 100 and provided to the processing circuitry 35 of the primary controller 34 via the high-speed IP network 48.

For the illustrated embodiment of the process 130, after receiving the partial models from the sensing units 38, the processing circuitry 35 fuses the partial models to generate (block 134) updated models (e.g., player, shadow, and/or skeletal) for each player based on the received partial models. For example, the processing circuitry 35 may update a previously generated model, such as an initial skeletal model generated in block 114 of the process 110 of FIG. 5. Additionally, as discussed, when combining the partial models, the processing circuitry 35 may filter or remove data that is inconsistent or delayed to improve accuracy when tracking players despite potential occlusion or network delays.

Next, the illustrated process 130 continues with the processing circuitry 35 identifying (block 136) one or more in-game actions of the corresponding virtual representations 14 of each of the players 12 based, at least in part, on the updated models of the players generated in block 134. For example, the in-game actions may include jumping, running, sliding, or otherwise moving of the virtual representations 14 within the virtual environment 32. In-game actions may also include interacting with (e.g., moving, obtaining, losing, consuming) an item, such as a virtual object in the virtual environment 32. In-game actions may also include completing a goal, defeating another player, winning a round, or other similar in-game actions.

Next, the processing circuitry 35 may determine (block 138) one or more in-game effects triggered in response to the identified in-game actions of each of the players 12. For example, when the determined in-game action is a movement of a player, then the in-game effect may be a corresponding change in position of the corresponding virtual representation within the virtual environment. When the determined in-game action is a jump, the in-game effect may include moving the virtual representation along the y-axis 20, as illustrated in FIGS. 1-4. When the determined in-game action is activating a particular power-up item, then the in-game effect may include modifying a status (e.g., a health status, a power status) associated with the players 12. Additionally, in certain cases, the movements of the virtual representations 14 may be accentuated or augmented relative to the actual movements of the players 12. For example, as discussed above with respect to modifying the appearance of the virtual representation, the movements of a virtual representation of a player may be temporarily or permanently exaggerated (e.g., able to jump higher, able to jump farther) relative to the actual movements of the player based on properties associated with the player, including items acquired during game play, items acquired during other game play sessions, items purchased in a gift shop, and so forth.

The illustrated process 130 continues with the processing circuitry 35 generally updating the presentation to the players in the play area 16 based on the in-game actions of each player and the corresponding in-game effects, as indicated by bracket 122. In particular, the processing circuitry 35 updates (block 140) the corresponding virtual representations 14 of each of the players 12 and the virtual environment 32 based on the updated models (e.g., shadow and skeletal models) of each player generated in block 134, the in-game actions identified in block 136, and/or the in-game effects determined in block 138, to advance game play. For example, for the embodiments illustrated in FIGS. 1 and 2, the processing circuitry 35 may provide suitable signals to the output controller 56, such that the processing circuitry 58 of the output controller 56 updates the virtual representations 14 and the virtual environment 32 presented on the display device 24.

Additionally, the processing circuitry 35 may provide suitable signals to generate (block 142) one or more sounds and/or one or more physical effects (block 144) in the play area 16 based, at least in part, on the determined in-game effects. For example, when the in-game effect is determined to be a particular virtual representation of a player crashing into a virtual pool, the primary controller 34 may cause the output controller 56 to signal the speakers 62 to generate suitable splashing sounds and/or physical effects devices 78 to generate a blast of mist. Additionally, sounds and/or physical effects may be produced in response to any number of in-game effects, including, for example, gaining a power-up, losing a power-up, scoring a point, or moving through particular types of environments. Mentioned with respect to FIG. 5, the process 130 of FIG. 6 may repeat until game play is complete, as indicated by the arrow 124.

Furthermore, it may be noted that the interactive video game system 10 can also enable other functionality using the scanning data collected by the array 36 of sensing units 38. For example, as mentioned, in certain embodiments, the processing circuitry 35 of the primary controller 34 may generate a player model (e.g., a volumetric or 2D player model) that that includes both the texture and the shape of each player. At the conclusion of game play, the processing circuitry 35 of the primary controller 34 can generate simulated images that use the models of the players to render a 2D or 3D likeness of the player within a portion of the virtual environment 32, and these can be provided (e.g., printed, electronically transferred) to the players 12 as souvenirs of their game play experience. For example, this may include a print of a simulated image illustrating the volumetric model of a player crossing a finish line within a scene from the virtual environment 32.

FIGS. 7-13 illustrate example embodiments of the interactive video game system 10 that enable the generation of virtual representations having augmented appearance and/or movements relative to those of the player. For these example embodiments, while only a single player is illustrated for simplicity, it is envisioned that these interactive video game systems may be simultaneously used by any suitable number of players (e.g., 12 players), as discussed above. Additionally, while not illustrated for simplicity, the example interactive video game systems illustrated in FIGS. 7-13 include any suitable features (e.g., sensors, controllers, display devices, physical effects devices, and so forth) mentioned herein to enable operation of the system 10, as discussed above.

With the foregoing in mind, in certain embodiments, virtual representations may be modified to appear and/or move differently from the corresponding players. That is, in certain embodiments, a virtual representation associated with a particular player may be able to transform or move in ways that do not directly correspond to (e.g., are not exactly the same as) the appearance or movement of the players. In certain embodiments, the virtual representations are not restricted by real world physical limitations imposed on the appearance or movement of the players, and, therefore, may be described as being associated with super human abilities. For example, in certain embodiments, virtual representations may include characters having greater-than-normal or super human abilities, such as characters that can jump higher or stretch farther than a realistic human can. In other embodiments, these super human abilities may include other super speed, super strength, size-altering abilities (e.g., to shrink and grow), abilities to shoot projectiles from various body parts (e.g., laser shooting eyes or hands, throwing fire or ice), and so forth. Accordingly, when players are in control of such virtual representations, then particular actual or real-world movements by the players trigger (e.g., a translated into) these super-human abilities of the virtual representations. By way of further example, and certain embodiments, the virtual representations may be representations of non-human entities. For example, in certain embodiments, the virtual representations may be animal-based representations of the players, wherein these representations have abilities (e.g., modes or styles of movement) that are distinct from, and/or augmented relative to, those of ordinary humans.

Figure 7:
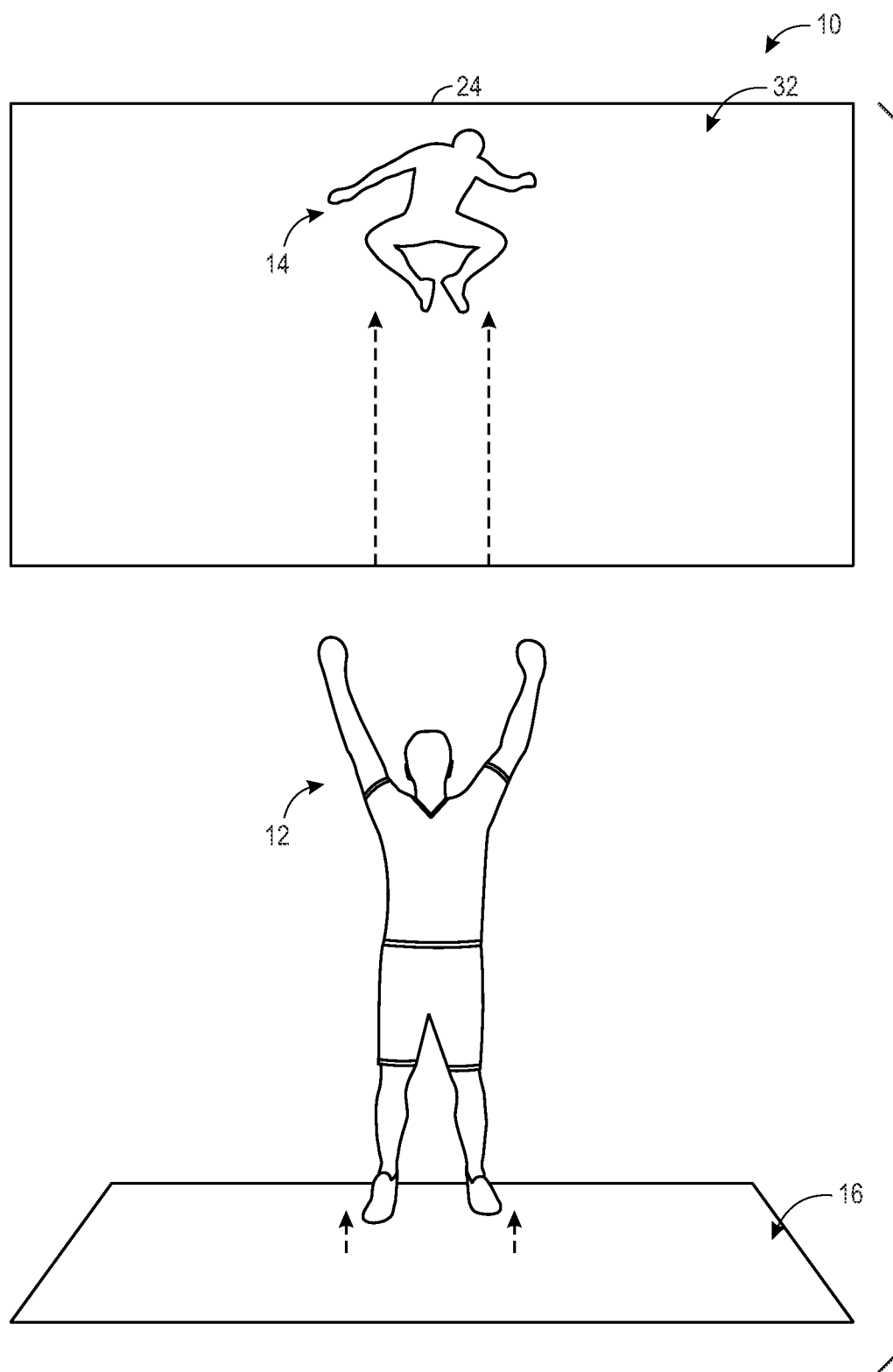

In one example illustrated in FIG. 7, a player 12 is positioned within the play area 16 during gameplay of the interactive video game system 10, while portions of the virtual environment 32 are presented on the display device 24. More specifically, the virtual environment 32 includes the virtual representation 14 that represents the player 12. As such, for the illustrated example, the virtual representation 14 has an appearance that generally resembles the appearance of the player 12, based on the scanning data and various models discussed above. However, unlike other examples discussed above, the virtual representation 14 illustrated in FIG. 7 demonstrates augmented physical movement relative to the detected movements of the player 12.

For the example illustrated in FIG. 7, the player 12 is illustrated as jumping a modest distance from the floor of the play area 16, while the virtual representation 14 is illustrated as performing a substantially larger jumping motion relative to a floor of the virtual environment 32. As such, the virtual representation 14 demonstrates an augmented (e.g., enhanced, exaggerated) jumping ability that is beyond that of a normal human (e.g., a super human jumping ability). In certain cases, the augmented jumping ability may be performed by the virtual representation 14 after acquiring a particular item (e.g., power-up) within the virtual environment 32, and may be temporary or permanent after acquiring the item. In other embodiments, the augmented jumping ability may be a feature or aspect of a particular character (e.g., a fictional character from a video game, book, or movie) upon which the virtual representation 14 is based. For such embodiments, by selecting a character associated with an augmented jumping ability, the virtual representation 14 may demonstrate this augmented jumping ability throughout gameplay. It should be appreciated that the augmented jumping illustrated in FIG. 7 is just one example of augmented movements, and that in other embodiments, any other suitable type of player movement (e.g., running, hopping, spinning, dancing, and so forth) may be identified and augmented by the processing circuitry 35 of the primary controller 34 based on the scanning data and the models (e.g., the skeletal models) discussed above, in accordance with the present disclosure.

In certain embodiments, a virtual representation 14 may be associated with abilities that affect both the appearance and the movement of the virtual representation 14 in response to particular movements of the player 12. For the example of FIG. 8, a player 12 is disposed in the play area 16 during gameplay of the interactive video game system 10, while a corresponding virtual representation 14 that is associated with a size altering super human ability is presented on the display device 24. In the particular example illustrated in FIG. 8, the player 12 has dropped to a crouching pose during gameplay. This crouching pose, when detected by the processing circuitry 35 of the primary controller 34 in the scanning data and the one or more models discussed above, represents a special or control pose that triggers a particular augmented ability of the virtual representation 14 or the virtual environment 32. It may be appreciated that, in other embodiments, other control poses may be used, in accordance with the present disclosure.

Figure 8:
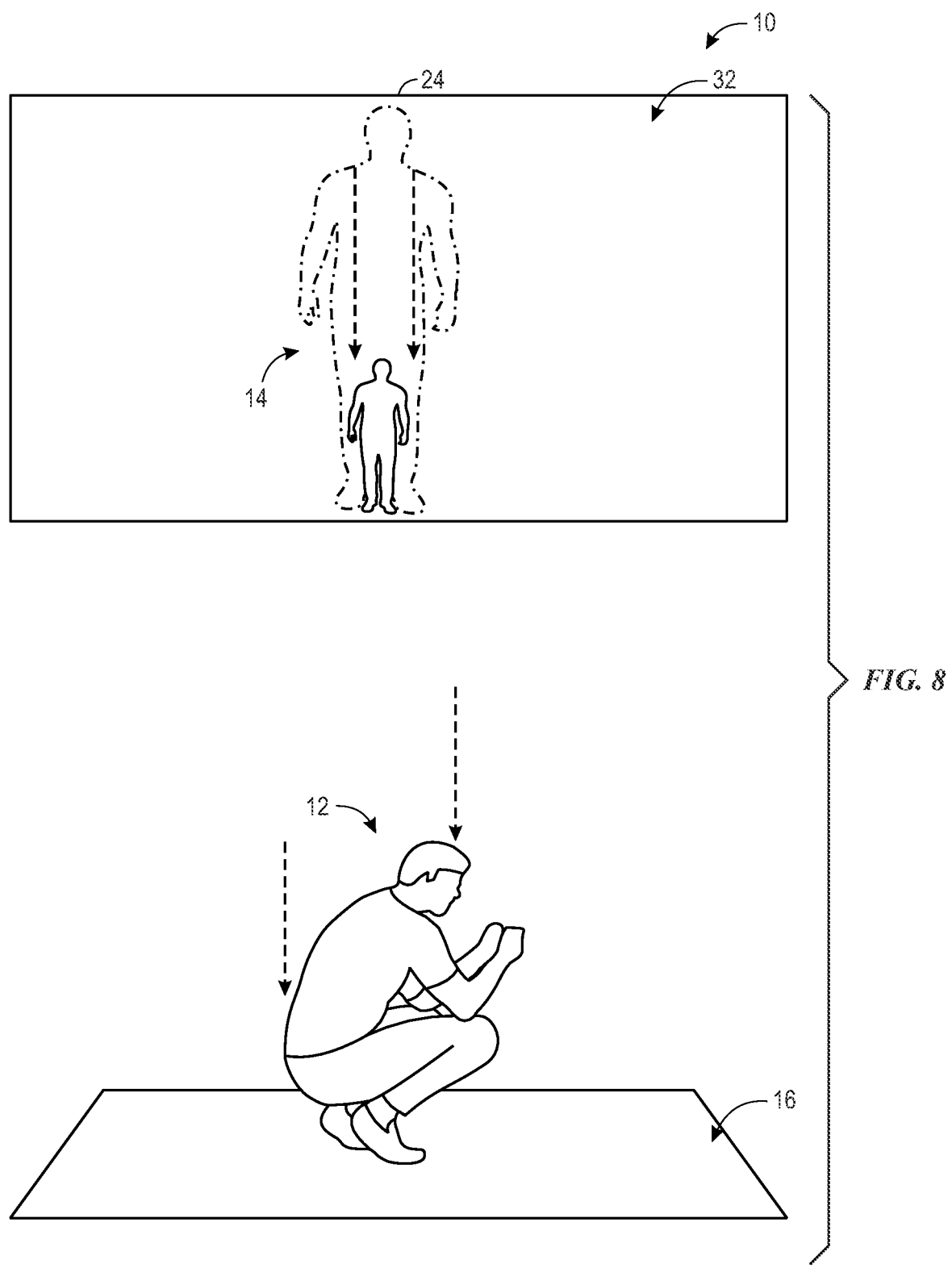

For the example illustrated in FIG. 8, in response to detecting the player 12 in the control pose (e.g., the crouching pose), the size of the illustrated virtual representation 14 is dramatically decreased, effectively shrinking the virtual representation 14 within the virtual environment 32. In certain embodiments, the virtual representation 14 may only maintain the reduced or diminished size while the player 12 remains in a crouching position. In other embodiments, once the controller 34 determines that the player 12 has taken the crouching control pose, the player 12 may stand erect again without the virtual representation 14 returning to its previous or original size. For such embodiments, the size of the virtual representation 14 may remain diminished until the primary controller 34 determines that the player 12 has assumed a second control pose (e.g., standing with arms and legs extended in a general "X" shape), triggering the enlargement of the virtual representation 14. In this manner, upon detecting one or more control poses, the primary controller 34 may trigger one or more special abilities or super powers that are either temporarily or permanently associated with the virtual representation 14.

It may be appreciated that, for the example illustrated in FIG. 8, the modified appearance of the virtual representation 14 may also be associated with differences in the movements and/or abilities of the virtual representation 14 within the virtual environment 32. For example, in certain situations, the smaller sized virtual representation 14 may demonstrate augmented (e.g., enhanced, exaggerated) movements relative to the detected movements of the player 12. That is, in certain situations, the smaller sized virtual representation 14 may continue to jump as high and run as fast as the player 12 despite its diminutive size. In other cases, the movement of the smaller sized virtual representation 14 may be reduced or lessened relative to the detected motion of the player 12 until the virtual representation 14 is restored to full size. In certain embodiments, the smaller sized virtual representation may demonstrate enhanced effects relative to features within the virtual environment 32. For example, the smaller sized virtual representation 14 may be more easily displaced or affected by a wind or current moving in the virtual environment, or may gain entry to locations in the virtual environment 32 that would be inaccessible to the larger sized virtual representation 14.

Figure 9:
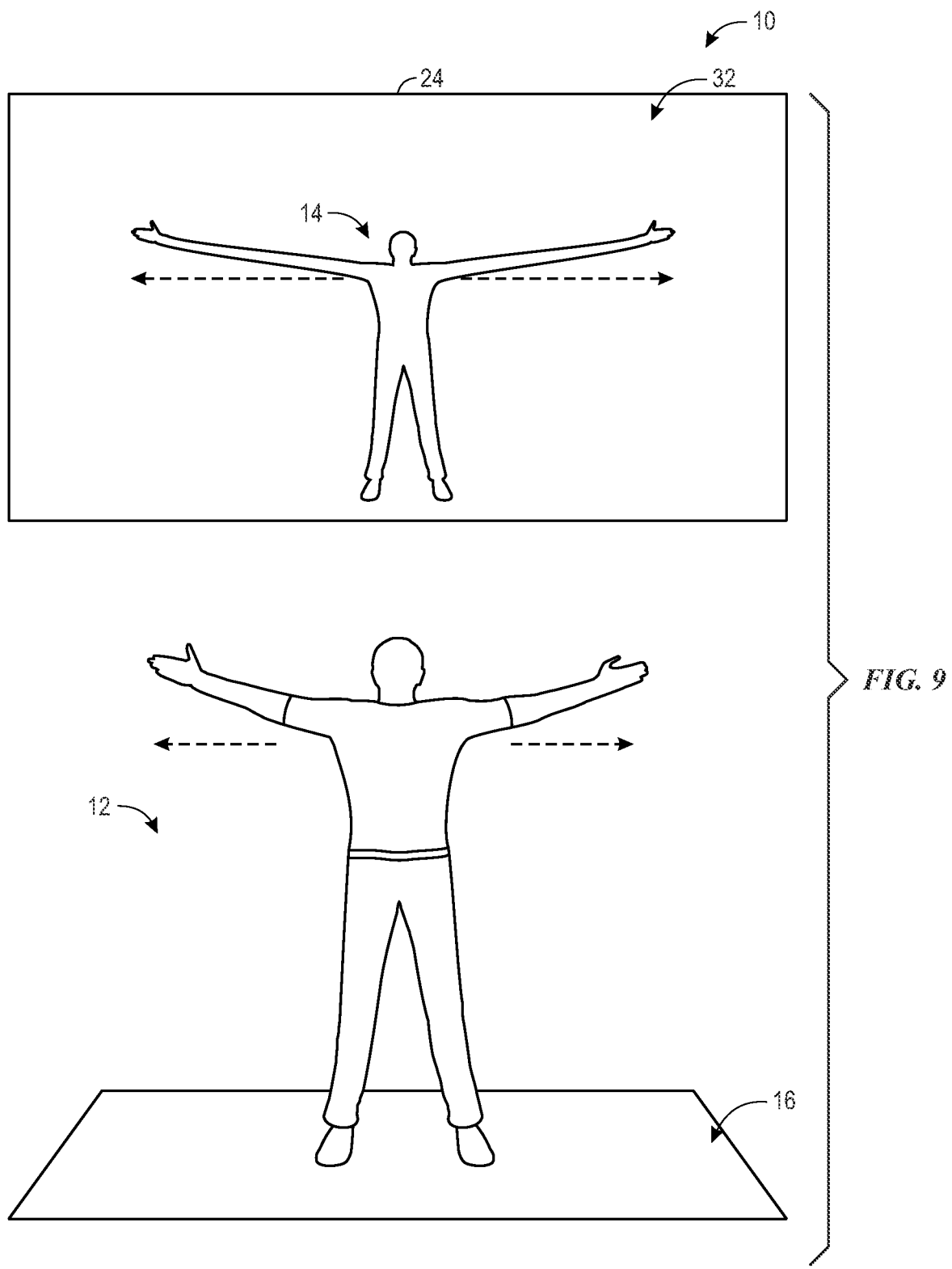

For the example of FIG. 9, a player 12 is disposed in the play area 16 during gameplay of the interactive video game system 10, while a corresponding virtual representation 14 associated with a super human stretching ability is presented on the display device 24. In the particular example illustrated in FIG. 9, the player 12 is extending or stretching arms from their sides during gameplay. For the illustrated embodiment, the virtual representation 14 that is associated with a super stretching ability may be based on a character selection by the player 12 at the beginning of gameplay, or may be based on a particular item (e.g., a super stretching power-up) obtained by the virtual representation 14 in the virtual environment 32 during gameplay.

For the embodiment illustrated in FIG. 9, in response to the primary controller 34 determining that the player 12 is extending their arms to a maximum extent, the processing circuitry 35 modifies both the appearance and movement of the virtual representation 14, such that the arms of the virtual representation 14 extend in an augmented (e.g., enhanced, exaggerated) manner. It may be appreciated that, this may enable the virtual representation 14 to perform particular tasks in the virtual environment 32. In other situations, the virtual representation 14 may stretch in different manners (e.g., from the legs, from the torso, from the neck) based on other movements or poses of the player 12 during gameplay. This augmented stretching ability may generally enable the virtual representation to access elements (e.g., items, weapons, entrances/exits, enemies, allies) that would be otherwise inaccessible in the virtual environment 32, providing the player 12 with an engaging and creative problem solving experience. Additionally, while a super stretching ability is illustrated in FIG. 9, in other embodiments, other enhanced abilities, such as super speed, super strength, and so forth, may also be implemented, in accordance with the present disclosure.

In certain embodiments, rather than exactly reproducing the appearance and movements of the player, a virtual representation may appear and move like a real or fictitious non-human entity, such as an animal virtual representation. In certain embodiments, a player may select a particular animal-based virtual representation at the beginning of gameplay, while in other embodiments, the animal-based virtual representation may be assigned automatically based on scanning data and/or models associated with the player. In certain embodiments, once selected or assigned, the virtual representation may remain the same throughout gameplay, while in other embodiments, the virtual representation may change periodically, or in response to particular movements or achievements of the player (e.g., different animal representations for different terrains in the virtual environment or different levels). When the virtual representation takes the form of a particular animal, then the virtual representation may have particular types of abilities (e.g., types of movement) that are different from those of the player 12, including some that may be difficult or impossible for the player 12 to actually perform (e.g., trotting like a horse, hopping like a kangaroo, swimming like a fish, flying like a bird, and so forth). As such, the appearance and movements detected by the primary controller 34 may be augmented (e.g., exaggerated, enhanced), such that the player 12 can use feasible, realistic human poses and movements within the play area 16 that are augmented to generate movements of the animal-based virtual representation 14.

Figure 10:
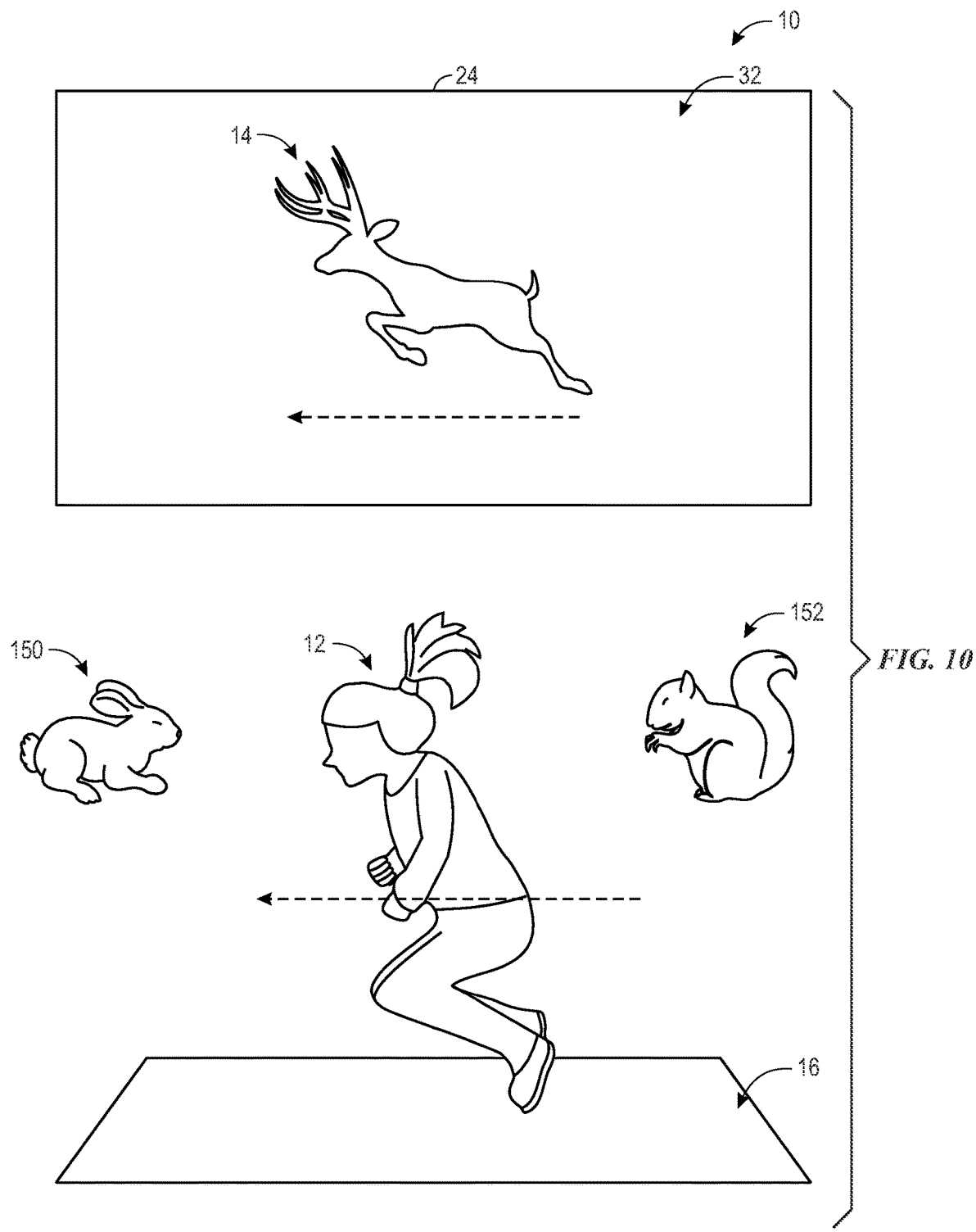

FIG. 10 illustrates an example embodiment in which a player 12 is disposed in the play area 16 during gameplay of the interactive video game system 10, while a corresponding animal-based virtual representation 14 capable of leaping movement is presented on the display device 24. For the illustrated embodiment, the virtual representation 14 is a stag virtual representation 14 that may be either selected by the player 12 at the beginning of gameplay, or selected by the processing circuitry 35 of the primary controller 34 based on the scanning data and/or models associated with the player 12. For example, in one embodiment, the stag virtual representation 14 was selected by the primary controller 34 for the player 12 upon detecting that the player 12 has "ponytails" or "pigtails" that remotely resemble the antlers of a stag. For such embodiments, the virtual representation 14 may include one or more features or characteristics that generally correspond to augmented (e.g., enhanced, exaggerated) features of the player 12 in a manner similar to a caricature art.

For the example illustrated in FIG. 10, the primary controller 34 detects the player 12 is skipping across the play area 16 during gameplay based on the scanning data and the one or more models. The primary controller 34 translates detected movements of the player 12 into suitable movement for the stag virtual representation 14. In particular, the primary controller 34 augments (e.g., enhances, exaggerates) the detected movements of the player 12, such that the stag virtual representation 14 leaps in the virtual environment 32 to a height and/or distance that is greater than what is detected, and potentially greater than what may be possible, for the player 12. Additionally, as mentioned above, the augmented moving (e.g., jumping, leaping, bounding) ability demonstrated by the virtual representation 14 may be used by the player 12 to achieve particular objectives in the virtual environment 32.

In certain embodiments, one or more real world figures (e.g., robotic elements, animatronic devices) may be part of the interactive video game system 10. For example, in certain embodiments, in addition or alternative to the virtual representation 14, the interactive video game system 10 may include a robotic representation, such as a robotic stag representation. Like the stag virtual representation 14 discussed above, the robotic stag is controlled by the primary controller 34 based on detected the movements of the player 12, and the controller 34 may augment (e.g., enhance, exaggerate) the detected movements of the player 12 when determining how to move the robotic stag representation. Additionally, in certain embodiments, the interactive video game system 10 may include other robotic elements, such as the illustrated robotic rabbit 150 and robotic squirrel 152. In certain embodiments, the movements of these additional robotic elements 150, 152 may be controlled based on the movements of other players in the play area 16. In other embodiments, these additional robotic elements 150, 152 may move in response to things occurring in the virtual environment 32, the movement of a robotic or virtual representation 14, or a combination thereof, to provide a more immersive experience that includes the movement of 3D, real world figures.

Figure 11:
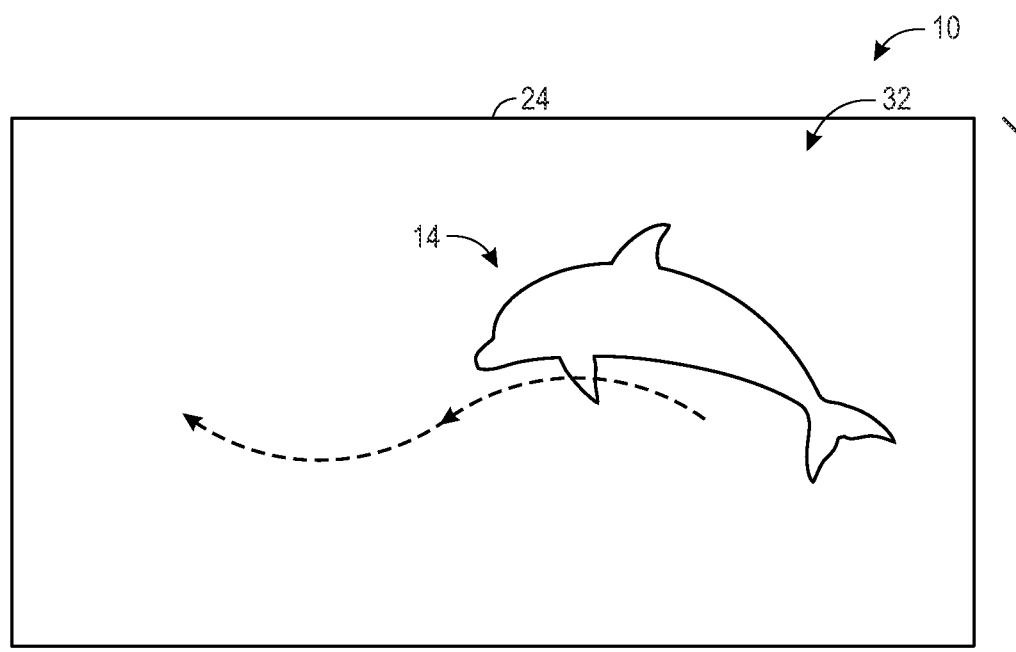
Figure 11:
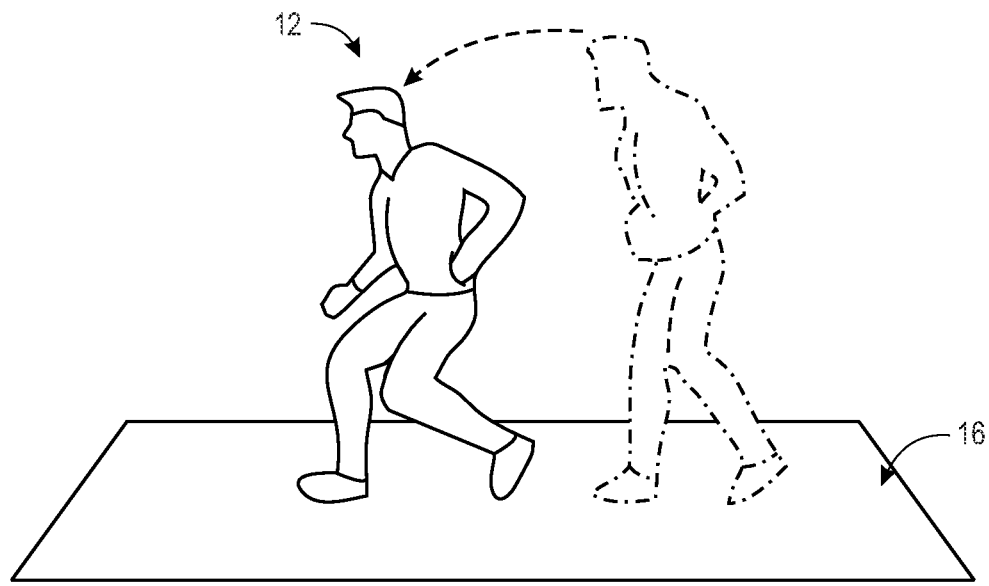

FIG. 11 illustrates another example of an animal-based virtual representation (e.g., an aquatic type animal) that enables augmented movements (e.g., swimming movements) relative to the detected movement of the players. In the illustrated example, a player 12 is moving through the play area 16 in an undulating fashion (e.g., walking, doing lunges). In response to detecting this movement, the primary controller 34 moves a dolphin virtual representation 14 in a corresponding undulating manner that is augmented (e.g., exaggerated, enhanced) relative to the movement of the player 12. Other player movements may be detected and translated into movements of the dolphin virtual representation 14. For example, the primary controller 34 may translate a detected jumping movement of the player 12 into a significant breach jump above a surface of a body of water in the virtual environment 32, or translate a detected swimming motion of the arms of the player 12 into a tail flicking motion of the dolphin virtual representation 14. For one or more of these movements, the primary controller 34 may augment (e.g., exaggerate, enhance) the movements of the dolphin virtual representation 14 relative to the actual detected movements of the player 12.

Figure 12:
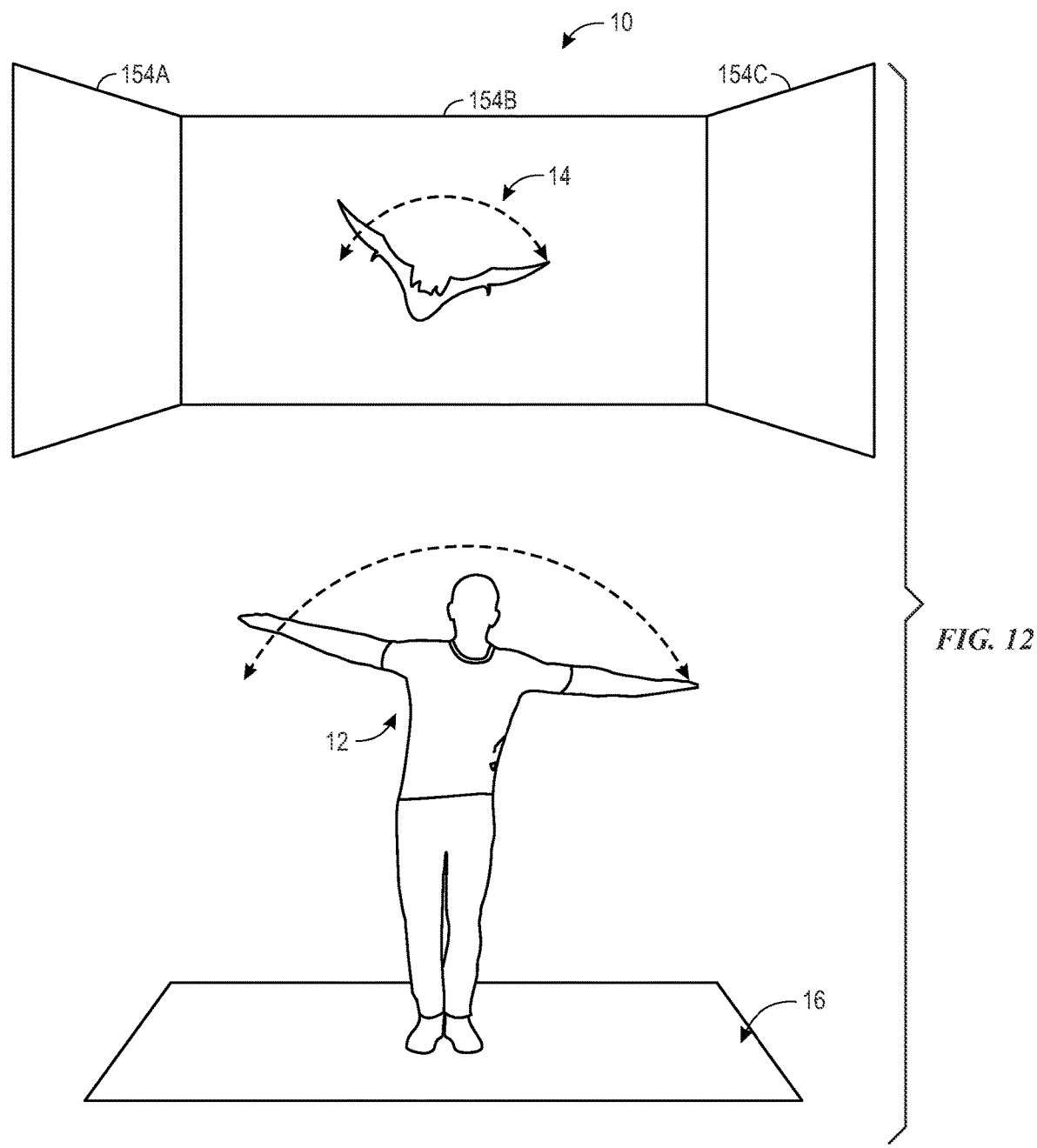

FIG. 12 illustrates another example of an animal-based virtual representation that enables augmented flying movement relative to the detected movement of the players. In the illustrated embodiment, a player 12 is positioned in the play area 16 such that the primary controller 34 detects and determine movements of the player 12 during gameplay of the interactive video game system 10. For the illustrated example, the player 12 controls a bat virtual representation 14, such that when the player poses or moves in a particular manner, these are translated and augmented into movements of the wings of the bat.

For the example illustrated in FIG. 11, in response to detecting the player 12 with their arms extended, the primary controller 34 may cause the wings of the bat virtual representation to extend. Further, in response to detecting the player 12 leaning left or right, the primary controller 34 may cause the bat virtual representation 14 to lean and steer to the left or right in a corresponding manner. Additionally, in certain embodiments, the player 12 may flap their arms to cause the bat virtual representation 14 to flap to gain altitude, and the player 12 may also tuck in their arms to cause the bat to dive. Furthermore, for the illustrated embodiment, the display device 24 includes a number of screens 154 (e.g., screen 154A, 154B, and 154C), which may enable the bat virtual representation 14 to fly from screen to screen around at least a portion of a perimeter of the play area 16. It may be appreciated that while examples of stag, dolphin, and bat virtual representations 14 is discussed with respect to FIGS. 10-12, the same technique may be applied to other animals having other ability and/or forms of movement. For example, it is envisioned that this technique may be applied to enable a player to pose and move in unique ways to control an animal-based virtual representation (e.g., to jump like a kangaroo, dig like a meerkat, to slither like a snake, and so forth). It may also be appreciated that this technique may also be applied to fictitious entities and animals, such that the disclosed system enables augmented movement of virtual representations 14 to, for example, gallop like a unicorn or fly like a dragon, based on the detected positions and movements of the players.

Figure 13:
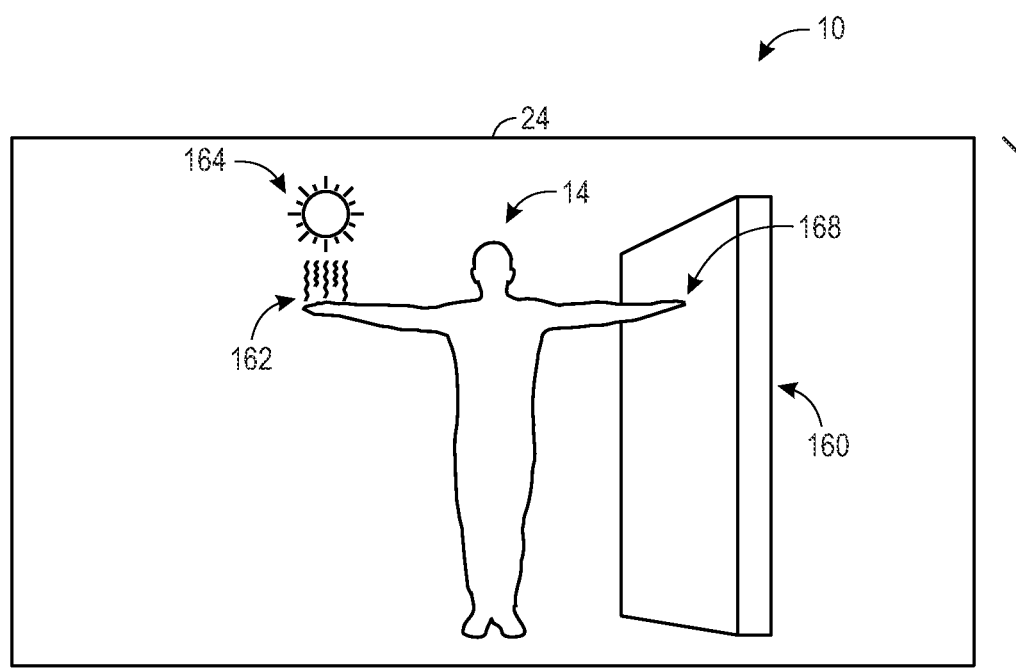
Figure 13:
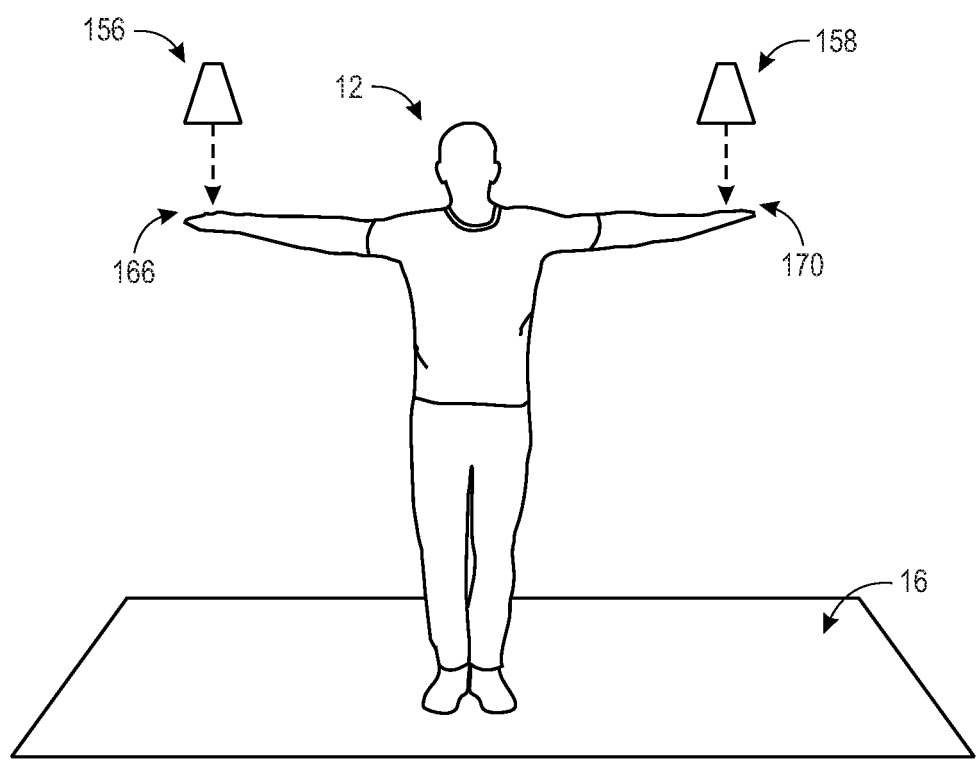

FIG. 13 illustrates an embodiment of the interactive video game system 10 that includes enhanced physical effects that are associated with the augmented abilities of a virtual representation 14. For the illustrated embodiment, a player 12 is positioned in the play area 16 near (e.g., below) two physical effects devices 156 and 158. In other embodiments, the physical effects devices 156 and 158 may be located above the play area 16, integrated within the floor of the play area 16, integrated within an interface panel 74 (as illustrated in FIG. 2), or otherwise situated to direct physical effects toward players in the play area 16. Physical effects device 156 is a thermal physical effects device that is designed to provide a thermal effects (e.g., infrared (IR) light, blasts of cold/hot air, blast of warm or cool mist) to the player 12 that correspond to events occurring within the virtual environment 32. In contrast, physical effects device 158 is an ultrasonic haptic device that is capable of using ultrasonic waves to provide a physical sensation of touch to the player 12 through the air, wherein the physical sensation corresponds to events occurring within the virtual environment 32.

More specifically, for the example illustrated in FIG. 13, the virtual representation 14 has received a fire-related power-up and is touching a barrier 160. That is, in the illustrated example, a first hand 162 of the virtual representation 14 is associated with the fire power-up, and a fire or sun symbol 164 is positioned near the first hand 162 of the virtual representation 14. Accordingly, the thermal physical effect device 156 may be an IR source (e.g., an IR lamp) that is activated by the primary controller 34 and directed toward a first hand 166 of the player 12. Additionally, a second hand 168 of the virtual representation 14 is illustrated as being in contact with the barrier 160 in the virtual environment 32. As such, the ultrasonic haptic physical effect device 158 is activated by the primary controller 34 and directed toward a second hand 170 of the player 12. Accordingly, the player 12 experiences a more immersive experience by feeling physical effects that are based on events and situations occurring in the virtual environment 32. In this manner, the interactive video game system 10 may provide enhanced feedback to the player 12 that extend one or more aspects of augmented movements and abilities into the real-world experience of the player 12.

The technical effects of the present approach includes an interactive video game system that enables multiple players (e.g., two or more, four or more) to perform actions in a physical play area (e.g., a 2D or 3D play area) to control corresponding virtual representations in a virtual environment presented on a display device near the play area. The disclosed system includes a plurality of sensors and suitable processing circuitry configured to collect scanning data and generate various models, such as player models, shadow models, and/or skeletal models, for each player. The system generates the virtual representations of each player based, at least in in part, on a generated player models. Additionally, the interactive video game system may set or modify properties, such as size, texture, and/or color, of the of the virtual representations based on various properties, such as points, purchases, power-ups, associated with the players. Moreover, the interactive video game system enables augmented movements (e.g., super human abilities, animal-based movements) that are enhanced or exaggerated relative to the actual detected movements of the players in the play area. Further, embodiments of the interactive video game system may include robotic devices and/or physical effects devices that provide feedback relative to these augmented movements and abilities, to provide an immersive gameplay experience to the players.

While only certain features of the present technique have been illustrated and described herein, many modifications and changes will occur to those skilled in the art. It is, therefore, to be understood that the appended claims are intended to cover all such modifications and changes as fall within the true spirit of the present technique. Additionally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive amusement system, comprising:
  a plurality of sensing units, wherein each sensing unit of the plurality of sensing units is configured to collect respective scanning data of a person positioned in an interaction area and to generate a respective partial model of the person by respective processing circuitry of the sensing unit;
  a video display disposed near the interaction area and configured to present a virtual representation associated with the person; and
  a controller communicatively coupled to the plurality of sensing units and the video display, wherein the controller is configured to:
    receive the respective partial model of the person from each sensing unit of the plurality of sensing units;
    fuse each received partial model to generate a model of the person;
    identify an action of the person based on the model;
    generate the virtual representation of the person based on the model and the identified action; and
    present, on the video display, the generated virtual representation of the person in a virtual environment performing augmented motions that correlate with the identified action of the person and that are exaggerated in accordance with the model.

2. The interactive amusement system of claim 1, wherein the generated virtual representation of the person is a silhouette of the person.

3. The interactive amusement system of claim 1, wherein the model includes a shadow model and the controller is configured to generate the virtual representation based on the shadow model.

4. The interactive amusement system of claim 1, wherein the model includes a skeletal model of the person, and wherein the controller is configured to identify the action of the person based on the skeletal model of the person.

5. The interactive amusement system of claim 1, wherein the controller is configured to generate a virtual object and present the virtual object on the video display based on the identified action of the person.

6. The interactive amusement system of claim 5, wherein the identified action of the person is a throwing motion and the virtual object is a thrown object.

7. The interactive amusement system of claim 6, wherein the augmented motions correspond to the throwing motion and exaggerated virtual action of the thrown object.

8. The interactive amusement system of claim 1, wherein the generated virtual representation depicts a super human ability that is triggered by the identified action of the person.

9. The interactive amusement system of claim 1, comprising a movable object model configured to generate a virtual moving object.

10. The interactive amusement system of claim 9, wherein the controller is configured present the virtual moving object as moving on the video display in coordination with the generated virtual representation of the person based on the movable object model and the model.

11. A method of operating an interactive amusement system, the method comprising:
  receiving, via processing circuitry of a controller, a respective partial model of a person from each of a plurality of sensing units, wherein each sensing unit of the plurality of sensing units is configured to collect respective scanning data of the person and generate the respective partial model of the person by respective processing circuitry of the sensing unit;
  fusing, via the processing circuitry of the controller, each received partial model to generate a model of the person;
  identifying, via the processing circuitry of the controller, an action of the person based on the model;
  generating, via the processing circuitry of the controller, a virtual representation of the person based on the model and the action; and
  presenting, via a video display that is viewable by the person, the generated virtual representation, in a virtual environment, performing a virtual action that corresponds to and is augmented relative to the action of the person.

12. The method of claim 11, comprising identifying a physical item held or worn by the person.

13. The method of claim 12, wherein the virtual action is based on a trait of the physical item.

14. The method of claim 11, comprising generating the virtual representation of the person as a silhouette.

15. The method of claim 11, comprising generating, via the processing circuitry of the controller, a virtual moving object in coordination with the virtual representation of the person.

16. The method of claim 15, wherein the virtual moving object is presented based on the virtual action.

17. An interactive amusement system, comprising a controller configured to:
  receive a respective partial model of a person from each sensing unit of a plurality of sensing units, wherein each sensing unit of the plurality of sensing units is configured to collect respective scanning data of the person and generate the respective partial model of the person by respective processing circuitry of the sensing unit;

fuse each received partial model to generate a model of the person;

identify an action of the person based on the model of the person;

generate a virtual representation of the person based on the model and the identified action;

activate an augmented activity of the virtual representation based on the identified action, wherein the augmented activity includes a virtual exaggeration of the identified action; and present, on a video display, the virtual representation in a virtual environment performing the augmented activity.

18. The interactive amusement system of claim 17, wherein the controller is configured to generate a virtual moving object based on the identified action, the augmented activity, or both.

19. The interactive amusement system of claim 17, wherein the controller is configured to generate the virtual representation as a silhouette of the person.

20. The interactive amusement system of claim 17, wherein the controller is configured to generate a virtual moving object and present the virtual moving object on the video display based on the identified action of the person corresponding to a throwing or kicking motion.

* * * * *